(12) United States Patent
Walter et al.

(10) Patent No.: US 10,926,570 B2
(45) Date of Patent: Feb. 23, 2021

(54) MULTILAYER BODY AND METHOD FOR PRODUCING A SECURITY ELEMENT

(71) Applicant: OVD Kinegram AG, Zug (CH)

(72) Inventors: Harald Walter, Horgen (CH); Wayne Robert Tompkin, Baden (CH)

(73) Assignee: OVD KINEGRAM, Zug (CH)

( * ) Notice: Subject to any disclaimer, the term of this patent is extended or adjusted under 35 U.S.C. 154(b) by 0 days.

(21) Appl. No.: 15/875,446

(22) Filed: Jan. 19, 2018

(65) Prior Publication Data

US 2018/0201043 A1 Jul. 19, 2018

Related U.S. Application Data

(62) Division of application No. 14/439,526, filed as application No. PCT/EP2013/073193 on Nov. 6, 2013, now abandoned.

(30) Foreign Application Priority Data

Nov. 6, 2012 (DE) .......................... 102012110630.4

(51) Int. Cl.
*G03H 1/00* (2006.01)
*B42D 25/29* (2014.01)
(Continued)

(52) U.S. Cl.
CPC .............. *B42D 25/29* (2014.10); *B41F 19/02* (2013.01); *B42D 25/324* (2014.10);
(Continued)

(58) Field of Classification Search
CPC ................. G03H 1/0011; G03H 1/024; G03H 2001/0027; G03H 1/0244; B42D 25/29;
(Continued)

(56) References Cited

U.S. PATENT DOCUMENTS

| 4,856,857 A | 8/1989 | Takeuchi et al. |
| 5,007,709 A | 4/1991 | Iida et al. |

(Continued)

FOREIGN PATENT DOCUMENTS

| CN | 102083632 | 6/2011 |
| CN | 102725148 | 10/2012 |

(Continued)

OTHER PUBLICATIONS

Trémeau, "Eléments de base de la Colorimétrie", Ecole d'Hiver sur l'Image Numérique Couleur—Proceedings, pp. 1-14; 2005.

*Primary Examiner* — Audrey Y Chang
(74) *Attorney, Agent, or Firm* — Hoffmann & Baron, LLP

(57) ABSTRACT

A multilayer body (1, 2, 3) and a method for producing a security element are described. The multilayer body has a metal layer (21). An optically active surface relief is molded at least in areas in a first surface of the metal layer (21) facing the upper side of the multilayer body or forming the upper side of the multilayer body and/or in a second surface of the metal layer (21) facing the underside of the multilayer body or forming the underside of the multilayer body. In at least one first area (31 to 39) of the multilayer body the surface relief is formed by a first relief structure (61). In at least one direction (617) determined by an allocated azimuth angle, the first relief structure (61) has a sequence of elevations (612) and depressions (614), the elevations (612) of which follow on from each other with a period P which is smaller than a wavelength of visible light, wherein the minima of the depressions (614) lie on a base surface and the first relief structure (61) has a relief depth t which is determined by the spacing of the maxima of the elevations (612) of the first relief structure (61) from the base surface in a direction perpendicular to the base surface. The profile shape and/or the relief depth t of the first relief structure (61) is chosen such that the colored appearance of the light (52,

(Continued)

53) incident on the first area (31 to 39) at least at a first angle of incidence and directly reflected by the metal layer (21) in the first area or directly transmitted through the metal layer is modified, in particular is modified by plasmon resonance of the metal layer with the incident light.

38 Claims, 28 Drawing Sheets

(51) Int. Cl.

| | | |
|---|---|---|
| *G02B 5/00* | (2006.01) | |
| *G02B 5/18* | (2006.01) | |
| *B42D 25/36* | (2014.01) | |
| *B42D 25/324* | (2014.01) | |
| *B42D 25/342* | (2014.01) | |
| *B42D 25/378* | (2014.01) | |
| *B42D 25/373* | (2014.01) | |
| *B42D 25/328* | (2014.01) | |
| *B41F 19/02* | (2006.01) | |
| *G03H 1/02* | (2006.01) | |

(52) U.S. Cl.
CPC ......... *B42D 25/328* (2014.10); *B42D 25/342* (2014.10); *B42D 25/36* (2014.10); *B42D 25/373* (2014.10); *B42D 25/378* (2014.10); *G02B 5/008* (2013.01); *G02B 5/1819* (2013.01); *G02B 5/1842* (2013.01); *G02B 5/1852* (2013.01); *G02B 5/1861* (2013.01); *G03H 1/0011* (2013.01); *G03H 1/0244* (2013.01); *B42D 2035/24* (2013.01)

(58) Field of Classification Search
CPC .... B42D 25/36; B42D 25/324; B42D 25/342; B42D 25/378; B42D 25/373; B42D 25/328; B42D 2035/24; G02B 5/1819; G02B 5/1852; G02B 5/1861; G02B 5/1842; G02B 5/008
USPC ........................................ 359/2, 569; 283/86
See application file for complete search history.

(56) References Cited

U.S. PATENT DOCUMENTS

| | | | |
|---|---|---|---|
| 5,714,231 A | 2/1998 | Reinhart | |
| 6,017,657 A * | 1/2000 | Mentz | B21H 8/005 205/70 |
| 6,569,517 B1 * | 5/2003 | McGurran | G02B 5/205 359/582 |
| 6,712,399 B1 * | 3/2004 | Drinkwater | B42D 25/328 283/101 |
| 7,085,024 B2 * | 8/2006 | Ishimoto | G03H 1/0252 283/86 |
| 7,974,010 B2 | 7/2011 | Walter et al. | |
| 9,004,540 B2 | 4/2015 | Rahm et al. | |
| 2004/0057113 A1 | 3/2004 | Tompkin | |
| 2004/0247010 A1 * | 12/2004 | Okada | G02B 5/1866 372/102 |
| 2005/0128590 A1 | 6/2005 | Schilling et al. | |
| 2007/0081246 A1 | 4/2007 | Stuck et al. | |
| 2007/0273142 A1 * | 11/2007 | Tompkin | B42D 25/324 283/72 |
| 2008/0094713 A1 | 4/2008 | Tompkin et al. | |
| 2009/0190223 A1 | 7/2009 | Petiton et al. | |
| 2011/0012337 A1 | 1/2011 | Heim | |
| 2011/0095518 A1 | 4/2011 | Hoffmuller et al. | |
| 2012/0146323 A1 | 6/2012 | Schilling et al. | |
| 2012/0235399 A1 | 9/2012 | Lochbihler | |
| 2014/0028012 A1 | 1/2014 | Petiton et al. | |
| 2014/0085725 A1 | 3/2014 | Lochbihler et al. | |
| 2015/0219807 A1 | 8/2015 | Lochbihler et al. | |

FOREIGN PATENT DOCUMENTS

| | | |
|---|---|---|
| DE | 10308305 | 9/2004 |
| DE | 10308327 | 9/2004 |
| DE | 102007061979 | 6/2009 |
| DE | 102010034085 | 2/2012 |
| DE | D102012015900 A1 | 3/2014 |
| EP | 1873202 | 1/2008 |
| GB | 2454752 A | 5/2009 |
| WO | WO0180175 A1 | 10/2001 |
| WO | WO03059643 | 7/2003 |
| WO | WO03082598 A2 | 10/2003 |
| WO | WO2007125266 A1 | 11/2007 |
| WO | 102009056933 | 6/2011 |
| WO | WO2011104551 | 9/2011 |
| WO | WO2012136777 | 10/2012 |
| WO | WO2012156049 A1 | 11/2012 |
| WO | WO2014023415 A1 | 2/2014 |

* cited by examiner

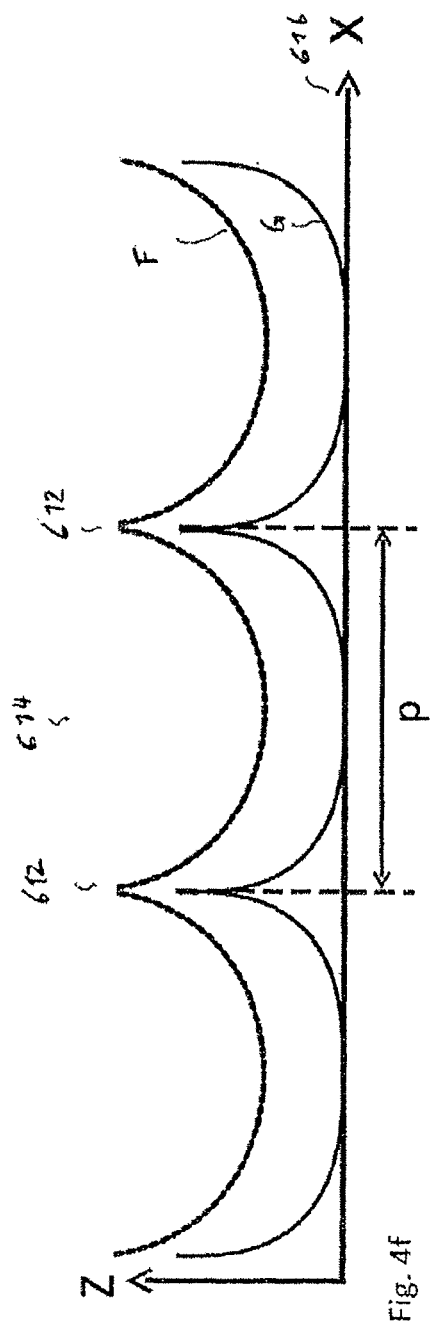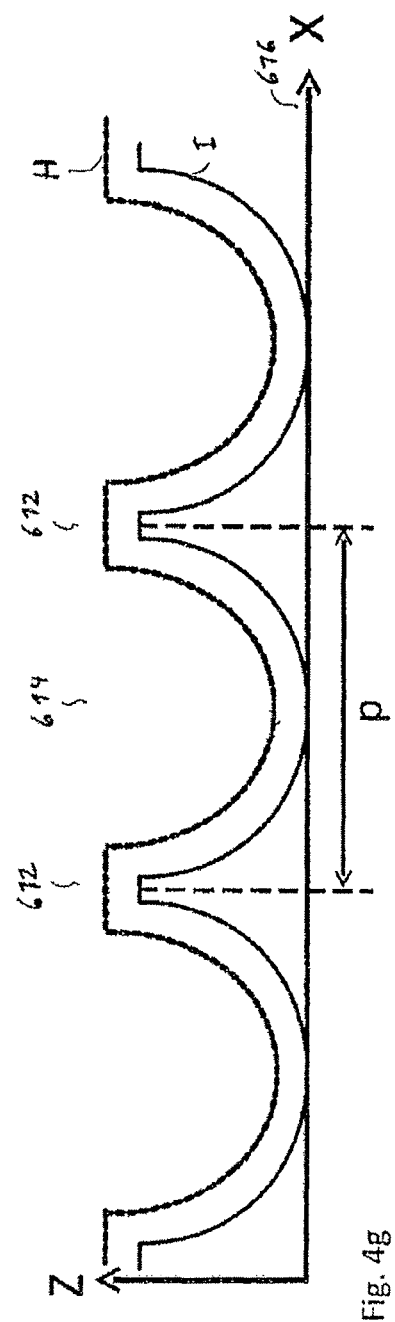

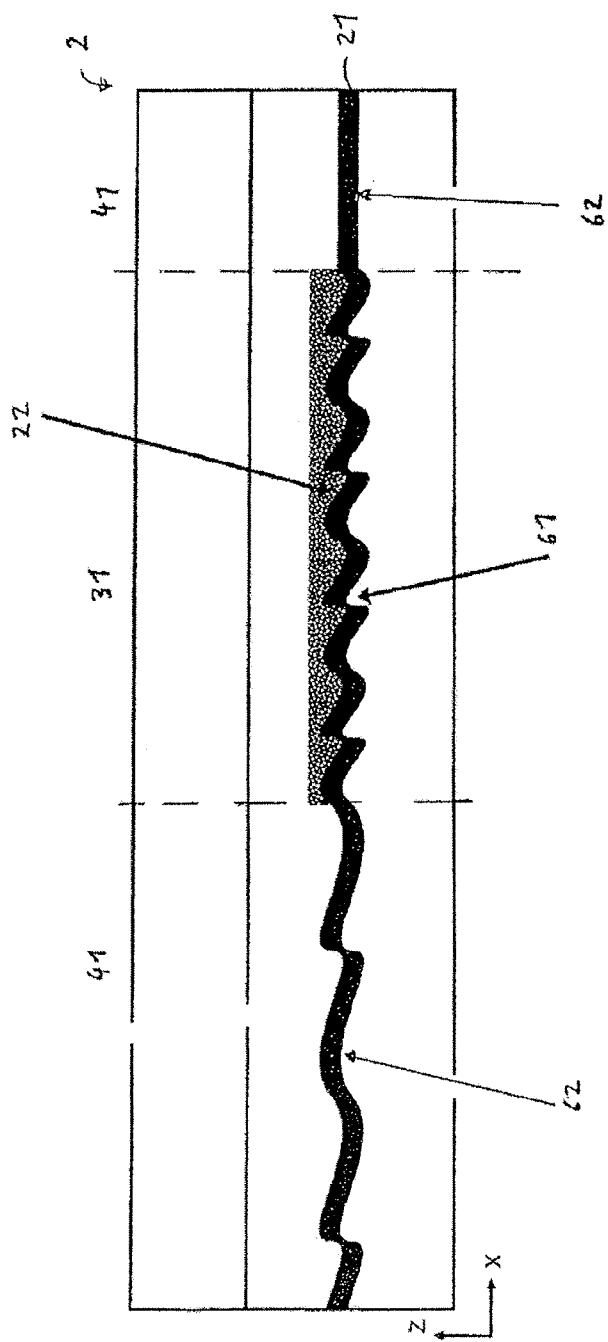

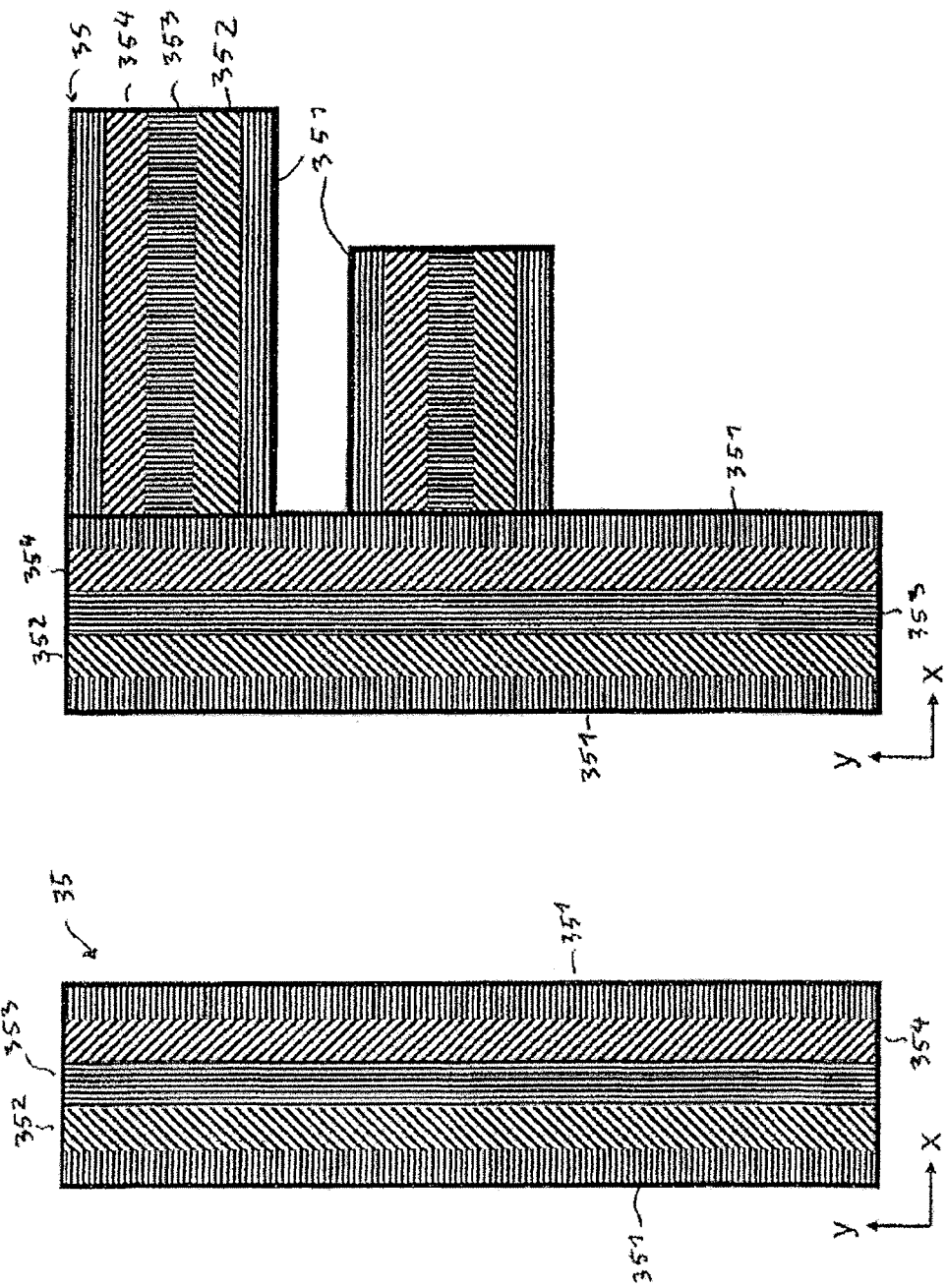

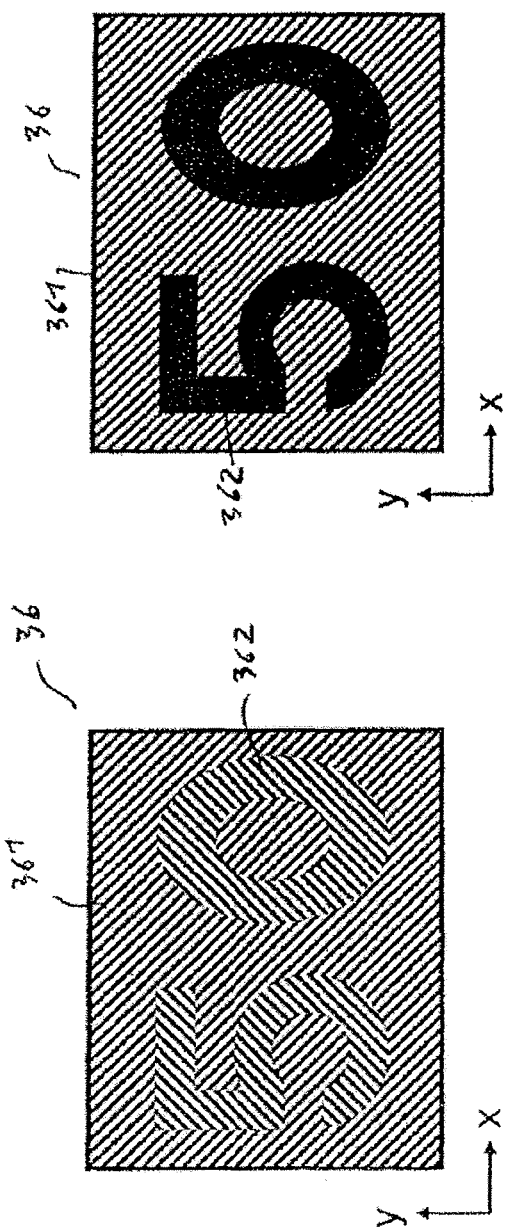

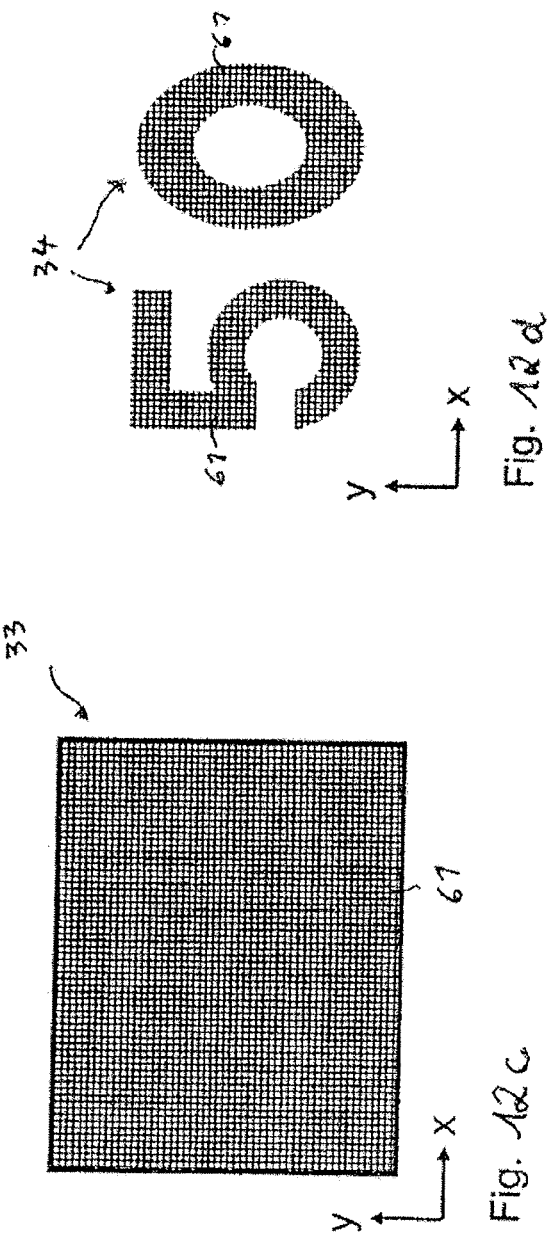

MULTILAYER BODY AND METHOD FOR PRODUCING A SECURITY ELEMENT

This application is a divisional application of U.S. application Ser. No. 14/439,526, filed Apr. 29, 2015, which claims priority based on an International Application filed under the Patent Cooperation Treaty, PCT/EP2013/073193, filed on Nov. 6, 2013, and German Application No. DE 102012110630.4, filed on Nov. 6, 2012.

BACKGROUND OF THE INVENTION

The invention relates to a multilayer body, in particular a security element for security documents, as well as a method for producing a security element.

It is known to apply to banknotes security elements which have a hologram or a computer-generated diffraction grating. Such security elements usually generate an optically variable effect by targeted diffraction of the incident light in the first or in higher diffraction orders and thus usually display only the impression of a mirror surface in direct reflection.

Further, it is known to generate color effects in direct reflection by using interference filters which can be added to a printing ink for example in the form of interference layer pigments. These interference filters are based on multilayer systems made of conductive and/or nonconductive (dielectric) layers, e.g. metal/nonconductive/metal or nonconductive/nonconductive/nonconductive, wherein the nonconductive layers have different refractive indices.

Further, in WO 03/059643 A1 the structure of a specific security element is described which has an integrated optical waveguide made of a transparent dielectric. The waveguide is embedded between layers of plastic into which a zero-order diffraction grating is molded. Color effects can also be generated in direct reflection here by the coupling of the incident light into and out of the waveguide.

SUMMARY OF THE INVENTION

The object of the invention is to specify a multilayer body and a method for producing a security element which is characterized by a high level of protection against forgery.

This object is achieved by a multilayer body with a metal layer in which an optically active surface relief is molded at least in areas in a first surface of the metal layer facing the upper side of the multilayer body or forming the upper side of the multilayer body and/or in a second surface of the metal layer facing the underside of the multilayer body or forming the underside of the multilayer body, wherein in at least one first area of the multilayer body the surface relief is formed by a first relief structure which, in at least one direction determined by an allocated azimuth angle, has a sequence of elevations and depressions, the elevations of which follow on from each other with a period P which is smaller than a wavelength of visible light, and wherein the minima of the depressions define a base surface and the first relief structure has a relief depth t which is determined by the spacing of the maxima of the elevation of the first relief structure from the base surface in a direction perpendicular to the base surface. This object is further achieved by a method for producing a security element in which a multilayer body comprising a metal layer with an optically active surface relief molded in a first surface or a second surface opposite the first surfaces is manufactured, wherein in at least one first area of the multilayer body the surface relief is formed by a first relief structure which, in at least one direction determined by an allocated azimuth angle, has a sequence of elevations and depressions, the elevations of which follow on from each other with a period P which is smaller than a wavelength of visible light, and wherein the minima of the depressions define a base surface and the first relief structure has a relief depth t which is determined by the spacing of the maxima of the elevations of the relief structure from the base surface in a direction perpendicular to the base surface. The profile shape and/or the relief depth t of the first relief structure here is chosen in particular such that the colored appearance of the light incident on the first area at least at a first angle of incidence and directly reflected by the metal layer or directly transmitted through the metal layer is modified, in particular is modified by plasmon resonance of the metal layer with the incident light.

The quantized oscillations of the charge carrier density in semiconductors, metals and insulators are called plasmons; quantum mechanically they are treated as quasiparticles. The term plasmon is a common abbreviation for quantum of plasma oscillation. What the photon is to electromagnetic waves, the plasmon is to oscillations in the Fermi gas of metals. A distinction is drawn between particle plasmons, surface plasmons and bulk plasmons. The first two belong to the plasmon polaritons, as here oscillations of the electron density couple with electromagnetic fields outside the metal. Strictly speaking, surface and particle plasmons should thus be given the adjunct polariton. The plasmon resonance in the security elements described in this document comes under the category of plasmon polaritons. Classically, plasmons can be visualized as electrons which oscillate relative to the positive ions. For better clarification, imagine a cubic metal block in a field oriented to the right. The free electrons now move to the left, until the field inside is balanced out. Positive ions are uncovered at the right-hand edge. If the external field is now switched off, the electrons migrate back to the right because they repel each other and are attracted to the positive ions. Thus the electrons now oscillate back and forth at the plasma frequency until the energy is used up by friction or other kinds of damping. Plasmons are the quantization of this natural oscillation.

The invention offers the advantage of providing security elements with an optical appearance which clearly sets itself apart from the previously known hologram effects with a silvery gloss and/or in rainbow colors, and of providing novel color effects which further increase the level of protection against forgery of security documents. Further, these effects also cannot be imitated by means of usual holographic techniques, and also cannot be copied by means of dot matrix and KineMax devices, with the result that a significant increase in the level of protection against forgery is also effected hereby. Furthermore, this multilayer body can be produced more cost-effectively than the known interference filters (e.g. Fabry-Perot filters), which are usually constructed from three or more layers, sometimes with very low thickness tolerances.

The optical appearance of the multilayer body is characterized in particular by a defined (i.e. largely monochromatic) color impression (e.g. red) which is to be seen in direct reflection and or transmission (thus under "normal" observation conditions). The color impression is stable over a relatively wide range of tilt angles (typically at least 10° to 20°). This color impression changes, in the case of a severe tilt (e.g. by 30°, to a second defined and stable color impression (e.g. green), similar to the case of so-called Fabry-Perot thin-film filters. Through this stability against slight tilting, it clearly differs from so-called rainbow color effects of first- or higher-order diffraction gratings, which often pass through the whole color palette of the rainbow when tilted by only 10°. Furthermore, the rainbow color effects of diffraction gratings appear, not in direct reflection, but at other angles, which can be calculated using the diffraction equation.

According to a preferred embodiment example of the invention the first relief structure has a profile shape that is asymmetrical in relation to a specular reflection at the base surface. It has surprisingly been shown, after lengthy investigations, that such profile shapes generate a much more visible and clearer color impression for the human observer than symmetrical profile shapes, for example symmetrical sinusoidal or rectangular profile shapes. Profile shapes that are symmetrical in this sense are characterized by a mirror symmetry in respect of the base surfaces. These profile shapes remain the same during this specular reflection, the relief structure is only shifted by half a period P. The optical effects in the case of observation from the two sides (at the same angle and under the same illumination conditions) are the same in the case of these mirror-symmetrical profile shapes, if the first relief structure is molded in both surfaces of the metal layer and the metal layer is embedded on both sides in a material with the same refractive index. Asymmetrical profile shapes in this sense do not have this mirror symmetry in the plane spanned by the base surface. These profile shapes are different when observed from the two sides. For example, a first relief structure with such an asymmetrical profile shape can consist of an arrangement of narrow peaks with wide valleys when observed from one side and can consist of wide hills with deep, narrow valleys when observed from the other side. Thus, investigations have also surprisingly shown that in the case of such a formation of the profile shapes, in respect of the plasmon resonance, the depressions act like subwavelength holes in a metal layer and promote the generation of plasmons.

The exciting electric field is more strongly localized by the asymmetrical profile shape (e.g. at the narrow peaks of the relief structure), which can lead to a more pronounced resonance, e.g. absorption. The excitation of the plasmons furthermore differs on the two sides in the case of asymmetrical profile shapes.

Further, the profile shape of the first relief structure is preferably chosen such that the width of the elevations and depressions of the first relief structure (with period P and relief depth t), relative to a distance of t/2 from the base surface (i.e. the "full width at half maximum" or FWHM), is at least $0.6 \times P$, preferably at least $0.7 \times P$, or at most $0.4 \times P$, in particular at most $0.3 \times P$ ("×" stands for the mathematical operation "times"). Thus the width of the elevations or the width of the depressions is determined at a distance of half the relief depth t from the base surface parallel to the base surface, i.e. the distance between neighboring edges of the first relief structure is determined relative to a distance of t/2, and this is chosen such that the above-mentioned conditions are satisfied. It has been shown that, if these conditions for the profile shapes of the first relief structure are complied with, particularly strong and aesthetic, i.e. well-defined, color impressions can be achieved for the human observer.

According to a preferred embodiment example of the invention the edge steepness of the first relief structure, relative to a distance of t/2 from the base surface, is between 60° and 90°, further preferably between 70° and 85°.

By edge steepness of the first relief structure is meant here the angle enclosed with the base surface by the edges of the relief structure in relation to a distance of t/2, i.e. the angle enclosed with the base surface by the tangents adjoining the edges at a distance of t/2 from the base surface. The distance from the base surface here is determined in a direction perpendicular to the base surface.

Investigations have shown that the strength of the color impression generated by the first relief structure, in particular in direct reflection or direct transmission, can also be further improved by compliance with these conditions.

The edge steepness of the first relief structure relative to each distance of between $\frac{1}{4} \times t$ and $\frac{3}{4} \times t$ from the base surface is preferably chosen such that it is between 40° and 90°, further preferably between 50° and 85°. The strength of the color impression which is generated by the first relief structure can also be further improved hereby.

Further, it is advantageous to choose the edge steepness of the first relief structure, relative to each distance of between 0 and $\frac{1}{4} \times t$ and/or between $\frac{3}{4} \times t$ and t from the base surface, to be between 0° and 50°, preferably between 0° and 40°. The strength of the color impression which is generated by the first relief structure can also be further improved hereby.

According to a preferred embodiment example of the invention the layer thickness d of the metal layer in the area of the edges of the first relief structure, relative to a distance of t/2 from the base surface, is chosen such that it is reduced by at least 30%, further preferably by at least 50%, further preferably by between 50% and 100%, compared with the thickness of the metal layer in the area of the maxima of the elevations and/or minima of the depressions. It has been shown that the color impression generated in the first area can also be further strengthened by these measures, and thus the optical appearance of the multilayer body is improved.

According to a preferred embodiment example of the invention the relief depth t of the first relief structure is between 80 nm and 500 nm, in particular between 100 nm and 400 nm and preferably between 120 nm and 300 nm. It has been shown that, in particular, if the relief depth t is chosen to be in the range between 150 nm and 300 nm, the strength of the color impression generated in the first area can be improved.

The period P of the first relief structure is preferably chosen to be smaller than a wavelength of visible light (=spectral range of between 400 nm and 700 nm), preferably chosen to be between 200 nm and 500 nm, in particular between 220 nm and 400 nm, further preferably between 220 nm and 350 nm. It has been shown that the color appearing to the human observer in the first area in direct reflection/transmission is modified by adjustment of the period P of the first relief structure, and thus the hue of the color impression or the color effect appearing in direct reflection or transmission at different angles of incidence and emergence can be modified by modification of the period P of the relief structure in the areas specified above.

The first relief structure can be formed as a linear grating which has a sequence of elevations and depressions in one direction. The line gratings can be constructed from straight or also curved, in particular snake-shaped (for so-called "snake gratings"), lines. However, it is also possible for the first relief structure to be formed as a cross grating or hexagonal grating or circular grating which has a sequence of elevations and depressions in two directions. In the case of a cross grating, the period P of the sequence of elevations and depressions in respect of the two directions is preferably chosen to be in the range specified above. Here, the period can be the same in both directions in the case of a cross grating. However, the period can also be different. This applies analogously to hexagonal gratings and circular gratings. Investigations have further shown that the formation of the first relief structure as a cross grating or as a hexagonal grating is to be preferred, as stronger color impressions appear in the case of these gratings.

In the first area the metal layer is preferably to be formed in a layer thickness d of between 10 nm and 100 nm, preferably between 15 nm and 80 nm and further preferably between 20 nm and 50 nm, if the multilayer body is designed for observation in reflected light.

The described effects can already be achieved with only one metal layer, as the core effect is not based on thin-film interference.

In the at least one first area the multilayer body preferably has only one metal layer, namely the metal layer in the first and/or second surface of which the first relief structure is molded.

In the first area, in addition to the metal layer and the layer or layers bordering the surface or surfaces with molded first relief structure of the metal layer, the multilayer body preferably has no further layers into which the first relief structure is molded. The effect generated by the metal layer with the first relief structure can hereby be prevented from being superimposed with interference effects and from being impaired in terms of its brilliance.

Further, it is also possible, by combination with additional thin layers, to achieve still further effects based on another functional principle, in particular interference effects. Optionally, therefore, another HRI layer, or also a layer sequence of HRI and LRI layers, e.g. an LRI and then an HRI layer, can be applied to the metal layer (HRI=High Refractive Index; LRI=Low Refractive Index). The HRI layer is preferably formed of ZnS or TiO2. The layer thickness of the HRI layer is preferably in the range of from 20 nm to 500 nm and further preferably in the range of from 50 nm to 200 nm. The LRI layer can be e.g. polymer or SiO2 or MgF2. The thickness of the LRI layer is preferably between 20 nm and 1000 nm and further preferably in the range of from 50 nm to 500 nm.

The plasmon resonance depends, among other things, on the refractive index of the material surrounding the metal layer. Therefore, e.g., an HRI layer with a high refractive index modifies the resonance and thus the color impression.

Further, it has been shown that a multilayer body according to the invention, in the case of a corresponding design of the layer thickness of the metal layer, generates color effects not only in reflected light, but also in transmitted light. It has been shown here that the optical depth (OD) of the metal layer for this is preferably to be chosen to be between 0.5 and 2.5, in particular between 0.7 and 2.3, further preferably between 1.0 and 2.0. The unit of optical depth (OD) here is based on the transmittance of the metal layer relative to an unstructured and thus smooth surface and has the following relationship to the transmittance T:

$$T=10-(OD)$$

There is thus an algorithmic relationship between transmittance T and optical depth OD. An optical depth of 1.0 corresponds to a transmittance of 10% and an optical depth of 2.0 corresponds to a transmittance of 1%. An optical depth of from 0.5 to 2.5 thus corresponds to an aluminum layer with a thickness of from 6 nm to 34 nm, an optical depth of from 0.7 to 2.3 corresponds to a layer thickness of an aluminum layer of from 8 nm to 31 nm and an optical depth of from 1.0 to 2.0 corresponds to a layer thickness of an aluminum layer of from 13 nm to 27 nm.

It has surprisingly been shown here that in the area in which the first relief structure is molded into the metal layer the transmission spectrum, and thus the color seen in transmission, changes and here the transmittance for particular wavelengths of light is higher than would be the case with a mirror surface. The reason for the increased transmittance in the area of the first relief structure probably lies in the excitation of plasmons by the incident light. The plasmons at the upper "boundary surface" of the metal layer excite plasmons at the lower "boundary surface" and, through this coupling, increase the intensity of the transmitted light for this wavelength range. In the immediate vicinity of the metal layer here, electric fields form with a superelevated field strength, which makes it possible for the plasmons to "channel" light through the metal layer.

It is thus possible, by means of a layered body according to the invention, to provide a metalized security feature which displays a first optically variable effect in reflected light observation on the upper side, displays a second optical effect, different from this, when observed from the underside—with a corresponding design of the relief shape, as stated above—and likewise displays an optical effect in transmitted light observation (depending on the adjusted optical density OD of the metal) with a corresponding design—as described above. In addition, in the case of transmitted light observation, the great advantage also results that—unlike when first- or higher-order transmissive diffraction structures are used—a corresponding optical effect also becomes visible in the case of direct transmission, i.e. also in the case of observation at a perpendicular angle, and thus a security feature is provided which can only be imitated with great difficulty using existing technology.

The multilayer body is preferably designed such that one or more layers of the multilayer body possibly provided above the metal layer and/or one or more layers of the multilayer body possibly provided underneath the metal layer are formed transparent or semitransparent, in particular have a transmittance of more than 15%, in particular of more than 50%, further preferably of more than 90%, in at least a partial area of the first area. It is hereby ensured that the optical effect generated by the metal layer and the first relief structure is visible in reflected light observation from the upper side, in reflected light observation from the underside and/or in transmitted light observation. It is hereby also possible for this partial area to be formed patterned and for the partial area of the first area surrounding this partial area to have at least one layer which is formed opaque, with the result that the optical effect generated by the metal layer and the first relief structure is visible only in the area determined by the shaping of the first partial area. It is also possible here for a mask layer to be provided in the multilayer body, above the metal layer and/or underneath the metal layer, which mask layer has a recess corresponding to the first partial area, wherein the recess of the mask layer provided above the metal layer and that of the mask layer provided underneath the metal layer can also be shaped differently, with the result that different items of information become visible in the case of reflected light observation from the upper side and from the underside.

Further, it is advantageous if the first surface of the metal layer is coated with a first dielectric layer and the underside of the metal layer is coated with a second dielectric layer, wherein the refractive indices of the first dielectric layer and of the second dielectric layer differ by at least 0.1, further preferably by at least 0.2. It can hereby be achieved that the optical appearance of the first area in the case of reflected light observation and/or transmitted light observation from the upper side differs from the corresponding appearance in the case of reflected light observation and/or transmitted light observation from the underside.

Further, it is advantageous if the first surface of the metal layer and/or the second surface of the metal layer is covered in areas with transparent dielectric layers with different refractive indices and the optical appearance of the multilayer body in different partial areas of the first area is hereby different because of the different refractive indices of this dielectric layer.

The profile shape and/or relief depth t of the first relief structure is preferably chosen such that in the case of direct reflection the metal layer has a reflectance of less than 15%, in particular of less than 10%, for the light incident at the first angle of incidence in the first area in a first spectral range visible to the human eye with a width of at least 50 nm, and in a second spectral range visible to the human eye with a width of between 10 nm and at most 200 nm, in particular 20 nm to 150 nm has a direct reflectance that is at least twice as high, furthermore at least 2.5 times, preferably at least 3 times and in particular at least 4 times, higher relative to the average value of the reflectance in the first spectral range.

This results in a color impression or colored appearance that is defined for the human observer and relatively stable. For a defined and relatively stable color impression in transmission, the transmittance values can be much lower than in reflection, and can even lie in the range of a few percent. It is important here that in a second spectral range visible to the human eye with a width of between 10 nm and at most 200 nm, in particular 20 nm to 150 nm, there is a direct transmittance that is at least twice as high, furthermore at least 2.5 times, preferably at least 3 times and in particular at least 4 times, higher relative to the average value of the transmittance in a first spectral range with a width of at least 50 nm. The width of the first spectral range is further preferably at least 100 nm.

The profile shape and/or the relief depth of the first relief structure is preferably further chosen such that in the case of a second angle of incidence different from the first angle of incidence the colored appearance of the light directly reflected in the first partial area or directly transmitted through the metal layer is modified differently and, in particular, different, relatively stable colors appear to the human observer at these angles of incidence in the case of reflected light observation or transmitted light observation (e.g. red in the case of almost perpendicular observation and green in the case of tilting by e.g. 30°). This corresponds to a defined color change during the tilt. The first angle of incidence preferably differs from the second angle of incidence by a value of between 10° and 45°.

For a simple recognition of the color change, it is advantageous if the lateral extent of the first area is at least 10 mm2, further preferably is at least 20 mm2, and thereby is clearly recognizable as an area of surface to the naked human eye.

According to a preferred embodiment example of the invention, in the first area or in at least one of the first areas the multilayer body has at least one dye and/or luminescent substance which is arranged less than 2 µm, in particular less than 1 µm, preferably less than 500 nm, further preferably less than 300 nm away from the first surface and/or the second surface of the metal layer. It has surprisingly been shown that dyes and/or luminescent substances in the case of such an arrangement close to the surfaces of the metal layer provided with the first relief structure have a massively strengthened absorption or fluorescence, compared with what is usually the case with these substances, for example in the case of an arrangement close to a mirror surface or "normal" diffractive structures. This effect is probably to be attributed to the fact that the plasmon excitation caused by the first relief structure generates an increased field strength. This increased field strength is present in the near field, i.e. above all up to a distance of approx. one wavelength of the exciting light. This increased field strength is responsible for the increase in the absorption or fluorescence of the dyes or luminescent substances.

Analogous effects are used e.g. in the analysis in so-called Surface Enhanced Raman Scattering (SERS). If the molecule is located close to a metallic surface (above all silver and gold), the Raman signal can be extremely enhanced. The electromagnetic enhancement is based on excitation of surface plasmons in the metal, which can generate locally very high fields at peaks on the surface or in particles. This field together with the incident light excites the molecule and thus leads to an enhanced Raman scattering. This effect falls off rapidly over the surface, but the molecule does not have to be bonded to the surface.

The enhancement mechanisms behind this are called surface plasmon polariton (or SPP) enhanced absorption and surface plasmon coupled emission (SPCE).

This discovered effect of a dye layer and/or luminescent substance layer can, as described below, be used in various ways in order to provide security features that are striking and can be imitated only with difficulty:

The first and/or second layer here is preferably applied to the first or second surface of the first metal layer in areas or over the whole surface in the first area and thus covers the first surface or the second surface in areas or over the whole surface in the first area. The first and/or second layer thus directly borders, in areas, the surface or areas of surface of the metal layer in which the first relief structure is molded into the metal layer. The first relief structure is thus preferably covered in areas or completely by the first or second layer. Further, it is also advantageous if the first or second layer is only applied to the metal layer in the first area and thus is only provided where the metal layer borders the first relief structure, and thus the above-described effects are generated.

The multilayer body preferably has at least one first layer bordering the first surface of the metal layer and/or at least one second layer bordering the second surface of the metal layer, which second layer has at least one dye and/or at least one luminescent substance. The term luminescent substances here includes, in particular, fluorescent or phosphorescent substances.

The layer thickness of the at least one first layer and/or of the at least one second layer is preferably between 20 nm and 2 µm, in particular between 50 nm and 1 µm, in particular between 100 nm and 500 nm. Through a corresponding choice of the layer thickness of the first layer and/or of the second layer it can be ensured here that the previously described effect predominates in the area in which the at least one first layer and/or second layer covers the first area, with the result that clearly different optical impressions result in the area in which the at least one first layer and/or at least one second layer covers the first area and in the area in which the at least one first layer and/or second layer does not cover the first area.

The concentration of the dyes or luminescent substances in the area of the first and/or second layer less than 1 µm, further preferably less than 500 nm, further preferably less than 300 nm away from the first or second surfaces of the metal layer is preferably higher than in the remaining area of the first or the second layer. The above-described action can hereby be further strengthened.

The at least one first layer and/or second layer can be applied to the metal layer directly, for example by means of a printing process, and in particular can consist of a varnish layer or of a protective varnish layer to which the at least one dye or luminescent substance has been added. Further, it is also possible for the at least one first layer and/or second layer to be formed by a replication varnish layer or by a layer applied to a replication varnish layer and for the metal layer to be deposited on this replication varnish layer or on the layer applied to the replication varnish layer, for example by vacuum vapor deposition.

The at least one dye and/or luminescent substance is preferably a soluble dye or luminescent substance. Alternatively, nanoparticles, such as e.g. quantum dot (QD), or also hybrid materials, such as e.g. dye-loaded zeolite crystals (as described for example in EP 1873202 A1), also come into consideration. Dyes from the following substance groups are preferably used as dye: metal-complex dyes, in particular with $Cr^{3+}$ or $Co^{2+}$ as the central atom. Examples are the Neozapon dyes from BASF and Orasol dyes from BASF (formerly Ciba). Luminescent substances from the following substance groups are preferably used: coumarins, rhodamines and cyanines.

The at least one first layer and/or the at least one second layer preferably have a transmissivity of at least 70%, preferably of at least 90%, in the wavelength range visible to the human eye. In particular if the dye is applied over the whole surface, it is advantageous if the transmittance of the colored layer is only minimally modified by the dye, with the result that no coloring is recognizable outside the first areas. According to a preferred embodiment example of the invention the concentration of the at least one dye and/or luminescent substance in the at least one first layer and/or the at least one second layer is chosen such that the optical action thereof in a second area in which the surface relief is formed by a mirror surface, a diffractive structure, a macrostructure or a mat structure is not visible to the human observer at an observation distance of more than 30 cm and under an illumination with white light (D65) with an illuminance of at least 100 lux, preferably at least 500 lux and at the same time less than 10,000 lux, but an optically recognizable action develops in the first area because of the previously described strengthening of the absorption or luminescence.

Alternatively, however, the dye is applied, in particular in a higher concentration, only where the structures of the first area have been replicated, or these structures of the first area are replicated (with the usual register tolerances) where the dye is present. A stronger influence on the color effect is thereby possible without at the same time dyeing areas outside the first area recognizably to the human eye.

In addition to the partial application of the dye in the first area, it is also possible to apply the dye in different concentrations inside and outside the first area or to apply two different dyes inside and outside the first area.

The percentage by weight of the at least one dye or luminescent substance in the dry weight of the first and/or second layer is preferably between 0.1% and 20%, in particular between 0.5% and 10%.

The proportion by weight of the dye or luminescent substance in the dry weight of the first and/or second layer is preferably between 1 mg/m2 and 200 mg/m2, further between 2 mg/m2 and 50 mg/m2 and preferably between 3 mg/m2 and 30 mg/m2 and in particular preferably 3 mg/m2 and 15 mg/m2. This has proved to be advantageous for achieving the above-specified effect.

The color of the at least one dye or luminescent substance of the at least one first and/or at least one second layer is preferably chosen such that its color, or its color when excited, corresponds to the color generated by the first relief structure for a particular angle of incidence of the incident light in direct reflection or transmission, or differs from this color. Depending on the color, different color effects, which thus at the least can only be imitated with great difficulty by other technologies and thus further increase the level of protection against forgery, can thus be generated at different observation angles in direct reflection and in direct transmission by corresponding color mixtures.

Two or more first layers and/or second layers are preferably provided, the dyes or luminescent substances of which are chosen such that the colors of the dyes of these layers, or the colors of the luminescent substances of these layers when excited, mutually differ. Thus it is possible for example for a first layer with a first dye to be applied to the first surface of the metal layer in a first region which partially overlaps the first area, for a first layer with a second dye to be applied to the first surface of the metal layer in a second region which overlaps the first area in areas, and for a second layer with a third dye to be applied to the second surface of the metal layer in a third region which overlaps the first area at least in areas and overlaps the first and second region in areas, wherein the colors of the first, second and third dyes differ. For one thing, with a corresponding choice of the layer thickness of the first layers and of the second layers, the effect already described above hereby results, that the action of the first, second and third dyes is much stronger in the area in which these layers overlap the first area than outside. In addition, corresponding color mixing effects with the optical effects generated by the first relief structure of the metal layer in the first area results, with the result that in the case of reflected light observation from the front and from the back side as well as in the case of transmitted light observation correspondingly different optical effects are also brought about in each case.

Further, it is also possible for one or more first layers or one or more second layers to overlap in areas. Interesting optical effects can also be achieved hereby: as already stated above, the filter action of the dyes and the luminescence of the luminescent substances depend on the distance of these substances from the first or second surface of the metal layer, with the result that, depending the sequence in which these layers lie on top of each other, these different color actions develop, in contrast to a usual color mixing of color layers lying one on top of another, in which case the sequence thereof has no influence on the resultant mixed color.

According to a preferred embodiment example of the invention the surface relief is formed by a second and/or further relief structure in one or more second areas and/or further areas. The second and/or further relief structure is a relief structure which is preferably formed by a diffractive relief structure, a holographic relief structure, a mat structure, a mirror surface, a refractive, almost achromatic macrostructure (i.e. a structure with a period of more than 5 μm), a lens, a grid of microlenses or a combination of such relief structures.

By diffractive relief structure is meant in particular a relief structure which has a spatial frequency of between 200 and 2000 lines/mm and in particular generates an optically variable effect by diffraction of the incident light in the first or a higher diffraction order. Examples of this are linear or cross gratings. Further, diffractive relief structures can also be formed by computer-generated holograms, for example by kinoforms.

Isotropic or anisotropic mat structures can be used as mat structures. By mat structure is meant a structure with light-scattering properties which preferably has a stochastic mat surface profile. Mat structures preferably have a relief depth (Peak-to-Valley=P-V) of between 100 nm and 5000 nm, further preferably between 200 and 2000. Mat structures preferably have a surface roughness (Ra) of between 50 nm and 2000 nm, further preferably between 100 nm and 1000 nm. The mat effect can be either isotropic, i.e. the same at all azimuth angles, or anisotropic, i.e. varying at different azimuth angles. By macrostructure is meant a structure the spatial frequency of which is smaller than 100 lines/mm and which generates an optical effect substantially by refraction. The effect is thus almost achromatic. Lenses can be molded as refractively acting lenses or also as diffractive lenses. A grid of microlenses is preferably formed by a one-dimensional or two-dimensional arrangement of microlenses, for example cylindrical lenses or spherical lenses. The grid width of a grid of microlenses is preferably between 300 µm and 50 µm.

The second and the further relief structures are preferably formed by relief structures which differ at least in one structure parameter and thus generate different optical effects.

The at least one first area or one of the first areas and the at least one second area in each case are preferably formed by a plurality of partial areas. These partial areas here preferably have at least one lateral dimension which is smaller than 300 µm.

The partial areas of the first area and the partial areas of the second area are further preferably arranged gridded in each other (interleaved). The interleaving preferably takes place with a size of the partial areas below the resolution limit of the human eye, i.e. in particular smaller than 300 µm.

Thus, it is possible for example for partial areas of the first area and in partial areas of the second area to follow on from each other alternating in one direction or in two directions. It is hereby possible for the effect to be achieved for the human observer that the optical effect generated by the first relief structure in the first area and the optical effect generated by the second relief structure in the second area are superimposed. Thus, for example, for the human observer at one and the same position of the multilayer body, the optical effect generated by the first relief structure is visible at a first angle of view and the optical effect generated by the second relief structure is visible at a second observation angle. Preferably, at least in the area in which the partial areas of the first area and of the second area are interleaved, the area ratio of the total surface area of the partial areas of the first area to the total surface area of the partial areas of the second area is chosen to be greater than 5:1, further preferably greater than 10:1. This high proportion of the first area is helpful in order to guarantee a very visible color effect.

Further, it is advantageous if the at least one second area is formed by a plurality of partial areas separated from each other and if the first area surrounds these partial areas as background area. Thus, it is possible for example to arrange the partial areas of the second area pseudorandomly or to choose their surface orientation, for example the orientation of their longitudinal axes, to be pseudorandom, and to surround these partial areas, thus arranged and/or oriented pseudorandomly, with the first area as background area. The first relief structure can here be formed for example by a mirror surface or by an achromatic structure, in order thus to achieve the superimposition of the optical appearance of the first area with a glitter effect or glimmer effect. The partial areas of the second area here preferably have lateral surface dimensions of between 50 µm and 300 µm.

According to a further embodiment example of the invention, the first area or at least one of the first areas has a patterned shaping and is thus molded for example in the form of letters, numbers, a symbol or a motif. This first area can be framed contour-like by a second area, wherein this second area has a second structure, e.g. a mat structure. This also accentuates the contour of the first area.

It is further advantageous here if the shaping of the first area or at least one of the first areas here is chosen such that this shaping contains an item of information that can only be made visible using an aid. Thus, it is possible for example for the first area or at least one of the first areas to be formed in the form of a nanotext which can be made visible by the human observer only with the aid of a magnifying device. Further, it is also possible for the first area or at least one of the first areas to be molded in the form of a moiré pattern in which a concealed item of information is encoded which can be made visible for example by means of a grid of microlenses or a correspondingly molded mask layer, e.g. a line grid, which grid or layer can likewise be part of the multilayer body.

According to a preferred embodiment example of the invention, the first area or at least one of the first areas has one or more first zones and one or more second zones in which one or more parameters of the first relief structure differ. The first relief structure in the first zones preferably differs from that in the second zones in terms of one or more of the parameters: period P, azimuth angle, relief depth t, base surface area and profile shape. Thus, for example, the first relief structure in the one or more first zones differs from the first relief structure in the one or more second zones in terms of the azimuth orientation, in order for example to encode information that is only recognizable by means of a polarizer, or also in terms of the period, relief depth or in terms of the incline of the base surface relative to a base plane, in order for example to generate movement effects or 3D effects.

Further, it is also possible for the first area or at least one of the first areas to comprise another one or more third or further zones which differ from the first zones and second zones in that one or more of the above-named parameters of the first relief structure in these are chosen to be different from those in the first and second zones.

Neighboring first and second and/or first, second, third and further zones are preferably spaced apart from each other by less than 10 µm, preferably less than 1000 nm.

The parameters of the first relief structure are preferably chosen to be identical in the first zones, identical in the second zones, identical in the third zones and/or identical in the further zones.

According to a preferred embodiment example, the first and second zones in each case have lateral dimensions of more than 300 µm, in particular a width and a length of in each case more than 500 µm and further preferably more than 2 mm. The one or more first and second zones are further preferably molded to form one motif, wherein the first zones form a foreground area of the motif and the second zones form a background area of the motif. Further, it is also possible for one or more first zones to be molded to form a first motif and one or more second zones to form a second motif.

According to a preferred embodiment example, the first, second and/or third zones have at least one lateral dimension of less than 300 µm, in particular of less than 150 µm, preferably of less than 80 µm. Further, the first, second and/or third zones are arranged interleaved at least in areas. Thus, it is possible for example for first, second and third zones to be arranged following on from each other alternating in one or in two directions.

Such a formation and arrangement of first, second and third zones makes it possible for example to generate movement effects, morphing effects (metamorphosis effects), multi-color representations or colored representations which are generated by means of additive color mixing. Thus, it is possible for example to arrange, interleaved, first zones to represent a first motif, second zones to represent a second motif and optionally third zones to represent a third motif, wherein the first, second and third motifs are visible to the observer in each case at an allocated angle of view. Further, the parameters of the first relief structure in the first, second and third zones can be chosen for example such that at a particular observation angle different colors, for example red, green and blue, are generated in the first, second and third zones. Through the corresponding choice of the arrangement of first, second and third zones in an area allocated to an image point, the color of the image point generated at this angle of view can then be generated by additive color mixing.

According to a preferred embodiment example of the invention, in the first area or in at least one of the first areas the base surface of the first relief structure is formed by a coarse structure or a mat structure. The base surface is thus not formed in the form of a flat surface, but modeled according to the coarse structure or mat structure. By coarse structure is meant here a structure the period of which is larger than the period P of the first relief structure by at least a factor of 5, further by a factor of 10, and in particular is between 1 µm and 10 µm. The relief depth of the coarse structures is by preference between 50 nm and 5000 nm, preferably between 100 nm and 2000 nm. The coarse structure can thus have surfaces inclined differently in areas, with the result that the effect generated by first relief structures in direct reflection/transmission shifts correspondingly in its angular range and thus is visible in different partial areas of the first area at different observation angles or, with a correspondingly random arrangement if a mat structure is used, is visible over a wider range of observation angles.

According to a preferred embodiment example of the invention, in the first area or in at least one of the first areas the period P of the first relief structure is varied in areas. The variation of the period P of the first relief structure here is preferably up to 10%, further preferably up to 5%. The period P of the first relief structure is preferably increased/reduced in one or more of the edge areas of the first area or increased or decreased depending on the distance from the center of area of the first area. It has been shown that interesting optically variable effects can be generated hereby and for example a "rolling bar" effect can be generated. Alternatively or in addition to this, the azimuth angle of the first relief structure can further also be varied (slightly) in areas.

By a "rolling bar" effect is usually meant an optical effect similar to a reflective cylindrical lens. In the process the areas of the cylindrical lens which reflect the light in the direction of an observer appear brighter than the areas which reflect the light in other directions. Thus, this function produces a kind of "light band" which appears to move over the cylindrical lens when the multilayer body is tilted in the direction of the angle of view. In the case of the structures claimed in this document, a somewhat different "rolling bar" effect results in which, instead of the "light band", now a "color band" appears to move over the cylindrical lens. For example a reddish core of a cylindrical lens (with a yellowish or greenish external area of the cylindrical lens) can move when the multilayer body is tilted in the direction of the angle of view.

According to a further preferred embodiment example of the invention, the first area or at least one of the first areas has a plurality of partial areas. Each of the partial areas has a minimum dimension of more than 3 µm and a maximum dimension of less than 300 µm. One or more of the parameters selected from the group: shape of the partial area, area size of the partial area, position of the center of area of the partial area, inclination angle of the base surface of the first relief structure relative to a base plane, angle of rotation of the base surface of the first relief structure about an axis perpendicular to the base plane, azimuth angle of the first relief structure, period P of the relief structure, is varied pseudorandomly, for the respective partial area, within a variation range predefined in each case for the first area.

For the above-named parameters, the following variation ranges are preferably chosen:

1) Shape of the partial area: rectangle, square, circle, oval, hexagon, octagon, rhombus.
2) Area size of the partial area: between 5 µm2 and 6000 µm2, further preferably between 5 µm2 and 300 µm2. If the area size of the partial areas is varied pseudorandomly, then the variation range is preferably 10% to 50% of the average area size of the partial areas.
3) Position of the center of area of the partial area: here, it has proved particularly worthwhile to choose the variation range of the random shift between +D/2 and −D/2, wherein D is the dimension of the partial areas in the direction of the x axis or of the y axis, and to fix the grid width of the grid in the direction of the x axis and/or of the y axis at 3/2 times the dimension D of the partial areas in the direction of the x axis or y axis.
4) Inclination angle of the base surface of the first relief structure relative to a base plane: preferably, the inclination angle, in particular the inclination angle Ax and/or Ay, of the partial areas is varied pseudorandomly in a variation range of from −45° to +45°, further preferably from −30° to +30°, particularly preferably −15° to +15°, in particular to achieve a glitter effect. The base plane here is spanned by the x axis and the y axis and the inclination angle Ax represents the inclination angle in the case of a rotation about the x axis and the inclination angle Ay represents the inclination angle in the case of a rotation about the y axis.
5) Angle of rotation of the base surface of the first relief structure about an axis perpendicular to the base plane: it is advantageous to vary this angle of rotation of the partial areas pseudorandomly in a variation range of from −90° to +90°, further preferably from −45° to +45° and particularly preferably −15° to +15°.
6) Azimuth angle of the first relief structure: variation range of from −90° to +90°, further preferably from −45° to +45° and particularly preferably −15° to +15°.
7) Period P of the relief structure: the variation of the period P is preferably up to 10%, further preferably up to 5% around an average value.

Further, it is also advantageous if the first area or at least one of the first areas has a plurality of partial areas and the parameters of the first relief structure in each of the partial areas are chosen according to a relief structure which is selected from a set of predefined relief structures pseudorandomly for the respective partial area.

Through this procedure, interesting optically variable effects can be generated, for example colored movements, glitter, glimmer and 3D effects.

The multilayer body is preferably formed as a transfer film, laminating film or security thread. In addition to the metallic layer, the multilayer body preferably also has one or more further layers selected from the group: replication layer, varnish layer, adhesion-promoting layer, adhesive layer, protective varnish layer, carrier layer and decoration layer. The multilayer body thus has for example a carrier film, preferably a transparent plastic film, e.g. made of PET, PC, PE, BOPP with a thickness of between 10 µm and 500 µm, a transparent replication layer, for example made of a thermoplastic or UV-curable replication varnish, and an adhesive layer, for example a cold-adhesive layer, a hot-melt adhesive layer or a UV-curable adhesive layer.

Preferably, the multilayer body is further formed as a security element of a security document, in particular a banknote or an ID document, and thus molded for example in the form of a patch or a strip. Further, it is also possible for the multilayer body to form a security document, for example a banknote, a card (e.g. credit card, ID card) or an ID document. The security document can moreover be a label, packaging for a commercial product, a ticket, a certificate or a revenue or tax stamp.

If the multilayer body is formed as a transfer film, then a partial area of the multilayer body is preferably stamped onto a substrate by means of an embossing stamp formed patterned. If the multilayer body has for example a homogeneous first relief structure which generates one of the above-described color effects, for example a color shift from red to green in the case of a rotation, then by an embossing stamp with a corresponding shaping, for example the shaping of a diamond, an element with this shaping, for example a diamond, with this color effect can be produced on the target substrate. Further, it is also possible for the multilayer body in this case to be applied to a substrate over the whole surface by means of a nonspecific laminating roller. Further, it is particularly advantageous here if the surface of the substrate onto which the multilayer body is stamped has a surface structure, in particular has a coarse structure or a mat structure, and if the stamping pressure is chosen such that the base surface of the first relief structure is deformed according to the coarse structure or mat structure during the stamping.

Further, it is also possible and also advantageous to process the multilayer body in one operation with a blind embossing die, in the stamping surface of which a coarse structure is molded. The stamping pressure here is chosen such that the base surface of the first relief structure is deformed according to the coarse structure of the blind embossing die while the blind embossing die is being pressed on. This method also makes it possible to customize the multilayer body subsequently in a subsequent work step by corresponding deformation of the base surface of the first relief structure and thus to introduce the additional optical effects already described above into a security element or a security document.

BRIEF DESCRIPTION OF THE DRAWINGS

The invention is explained by way of example below with reference to several embodiment examples with the aid of the attached drawings.

FIG. 1b shows a schematic sectional representation of the security document according to FIG. 1a.

FIG. 4b shows a schematic top view of the relief structure according to FIG. 4a.

FIGS. 4f and 4g in each case show a schematic sectional representation of a relief structure.

FIG. 6c shows a diagram to illustrate the reflection behavior of the security element according to FIG. 6a.

FIG. 6d shows a schematic sectional representation of a cut section of a security element.

FIG. 8a and FIG. 8b show schematic top views of an area of a security element.

FIG. 9a and FIG. 9b show schematic top views of an area of a security element.

FIG. 12c shows a schematic top view of a cut section of the transfer layer of the transfer film according to FIG. 12a.

FIG. 12d shows a schematic top view of a cut section of the substrate according to FIG. 12b after the stamping.

FIG. 14b shows a schematic representation to illustrate the orientation of the base surface of a relief structure provided in the partial areas according to FIG. 14a.

DETAILED DESCRIPTION OF THE INVENTION

Figure 1A:
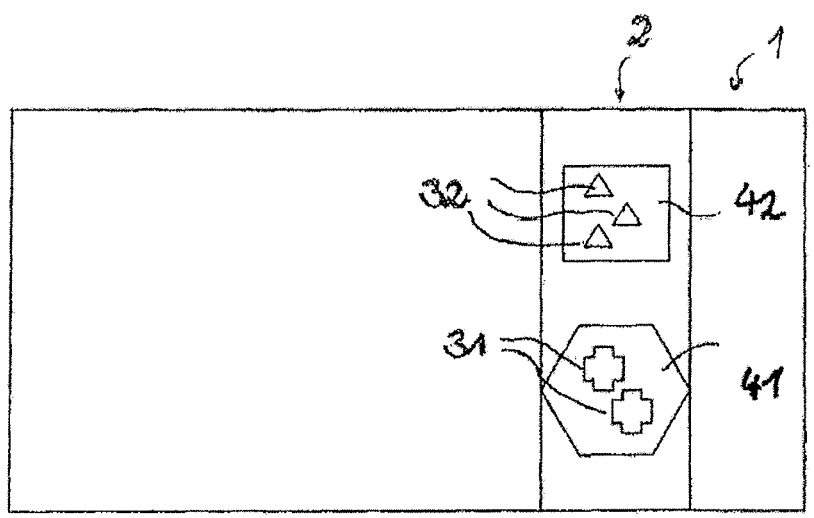
FIG. 1a shows a schematic top view of a security document with a security element.
Figure 1B:
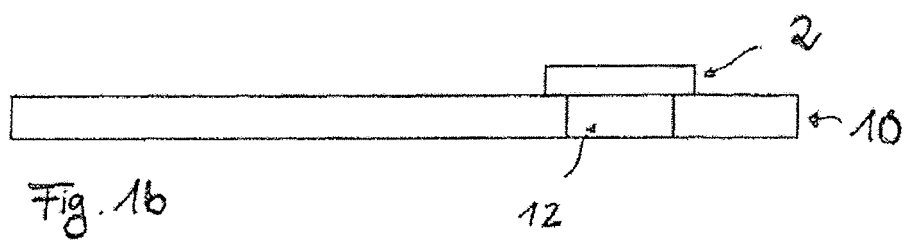

FIG. 1a and FIG. 1b show a security document 1. The security document 1 is preferably a banknote. However, it is also possible for the security document 1 to be for example an ID document, a label for product assurance, an ID card or credit card, prepaid card, a hang tag for a commercial product or a certificate, in particular a software certificate.

The security document 1 has a carrier substrate 10 and a security element 2 applied to the carrier substrate 10.

The carrier substrate 10 is preferably a paper substrate, for example with a layer thickness of between 50 or 500 µm. However, it is also possible for the substrate 10 to be a plastic substrate or a substrate made of one or more plastic and/or paper layers. Further, it is also possible for one or more further security elements, in addition to the security element 2, also to be applied to the substrate 10 or to be integrated into the layer structure or the layers of the substrate 10. The substrate 10 thus has for example one or more of the following elements as further security elements: a watermark, a security print, a security thread, a patch with one or more security features which are effected for example by a holographic or diffraction-optical structure.

The security element 2, in the embodiment example according to FIG. 1a and FIG. 1b, has a strip-like shaping and extends over the whole width or length of the security document 1. Further, the security element 2 covers a window area 12 of the substrate 10, in which the substrate 10 has a recess or through hole or is formed transparent. Thus, in this area, the security element 2 is visible both in the case of observation from the front side and in the case of observation from the back side of the security document 1. However, it is also possible for the security element 2 to have another shaping, for example to be formed as a patch, or not to be arranged in a window area of the security document 1, but to be applied completely on an opaque area of the substrate 10.

The security element 2 is preferably a laminating film which has a carrier substrate, a metal layer, one or more optional decoration layers and an adhesive layer, with which the laminating film is fixed to the substrate 10. The carrier substrate is preferably a transparent plastic film with a layer thickness of between 10 µm and 500 µm, in particular between 15 µm and 150 µm, for example made of BOPP or PET or PC (polycarbonate). The adhesive layer is preferably a hot-melt adhesive layer, a cold-adhesive layer or a UV-curable adhesive layer, or a heat-curable or heat-crosslinking adhesive layer, or a hybrid adhesive layer with thermoplastic and heat- and/or radiation-curing components.

Further, it is also possible for the security element 2 to be formed as a transfer film or transfer layer of a transfer film. In this case, a release layer is also provided between the carrier layer and the metal layer, or the carrier film is not provided. Further, it is also possible for the security element 2 to be formed as a security thread and not, as shown in FIG. 1b, to be applied to the surface of the substrate 10, but rather to be embedded at least in areas in the substrate 10 or to be arranged alternating on the upper side and the underside of the substrate 10. In this case, the security element 2 preferably consists of a carrier film, the metal layer, one or more optional decoration layers and optionally an adhesion-promoting layer which is provided on the upper side and/or the underside of the security element 2.

Further, it is also possible for the security element 2 to be provided by layers of the substrate 10, in particular if the security document 1 is a security document in the form of a card. In this case, the security element consists of a metal layer and one or more optional decoration layers which effect the functions described below.

The security element 2 preferably has one or more areas 31, 32, 41 and 42 in which a metal layer is provided at least in areas. An optically active surface relief is molded at least in areas into the surface of the metal layer facing the upper side of the security document and/or into the surface of the metal layer facing the underside of the security document 1. In the one or more areas 31 and 32, this surface relief is formed here by a first relief structure which, in at least one direction determined by an allocated azimuth angle, has a sequence of elevations and depressions, the elevations of which follow on from each other with a period P which is smaller than a wavelength of visible light. The more precise structure of this first relief structure is explained below again with reference to numerous embodiment examples. In the one or more areas 41 and 42, the surface relief is formed by a second and/or further relief structure which is or are selected from the group: diffractive relief structure, holographic relief structure, mirror surface, mat structure, macrostructure, lens or grid of microlenses. Further, it is also possible for the second and/or further relief structure not to be molded in a surface of a metal layer in one or more of the areas 41 and 42, but rather to be molded between two transparent layers of the security element 2 which differ in terms of their refractive index by more than 0.2, or to be molded in the surface of a high or low refractive index dielectric layer, for example a ZnS layer.

The areas 32 and 42 here overlap the window area 12 at least in areas, with the result that the security element 2 in the areas 32 and 42 is visible at least in areas from the upper side and underside of the security document 1. In the areas 32 and 42, the optical effect generated by the first or second relief structure is thus visible in the case of observation from the upper side of the security document 1, in the case of observation from the underside of the security document 1 and/or in the case of observation in transmitted light. The areas 31 and 41 are preferably not arranged in the window area 12. The optical effect formed by the first relief structure or second relief structure in the areas 31 or 41 is thus preferably only visible in the case of reflected light observation from the front side of the security document 1.

Further, it is also possible for the security element 2 to have still further security features, for example to have a security print, one or more layers containing optically variable pigments, one or more layers containing fluorescent or phosphorescent substances or one or more layers which provide a machine-readable security feature, e.g. a barcode, a magnetic strip, machine-readable pigments, feature substances or taggants.

As also represented in FIG. 1a and FIG. 1b, the areas 31, 32, 41 and 42 represent areas of the security document 1 or security element 2 which result in the case of a top view observation of the security element 2, i.e. form areas in respect of an observation perpendicular to a plane defined by the upper side or underside of the security document 1 or security element 2. This also applies to the other areas, zones and partial areas described here.

Further, the number of the areas 31, 32, 41 and 42 and their types of molding are represented by way of example in FIG. 1a, with the result that the areas 31, 32, 41 and 42 can have another shaping, can be provided in another number, and furthermore it is also sufficient if only one area 31 or one area 32 is provided in the security element 2.

The structure of the security element 2 in a partial area 31 is explained below by way of example with reference to FIG. 2.

Figure 2:
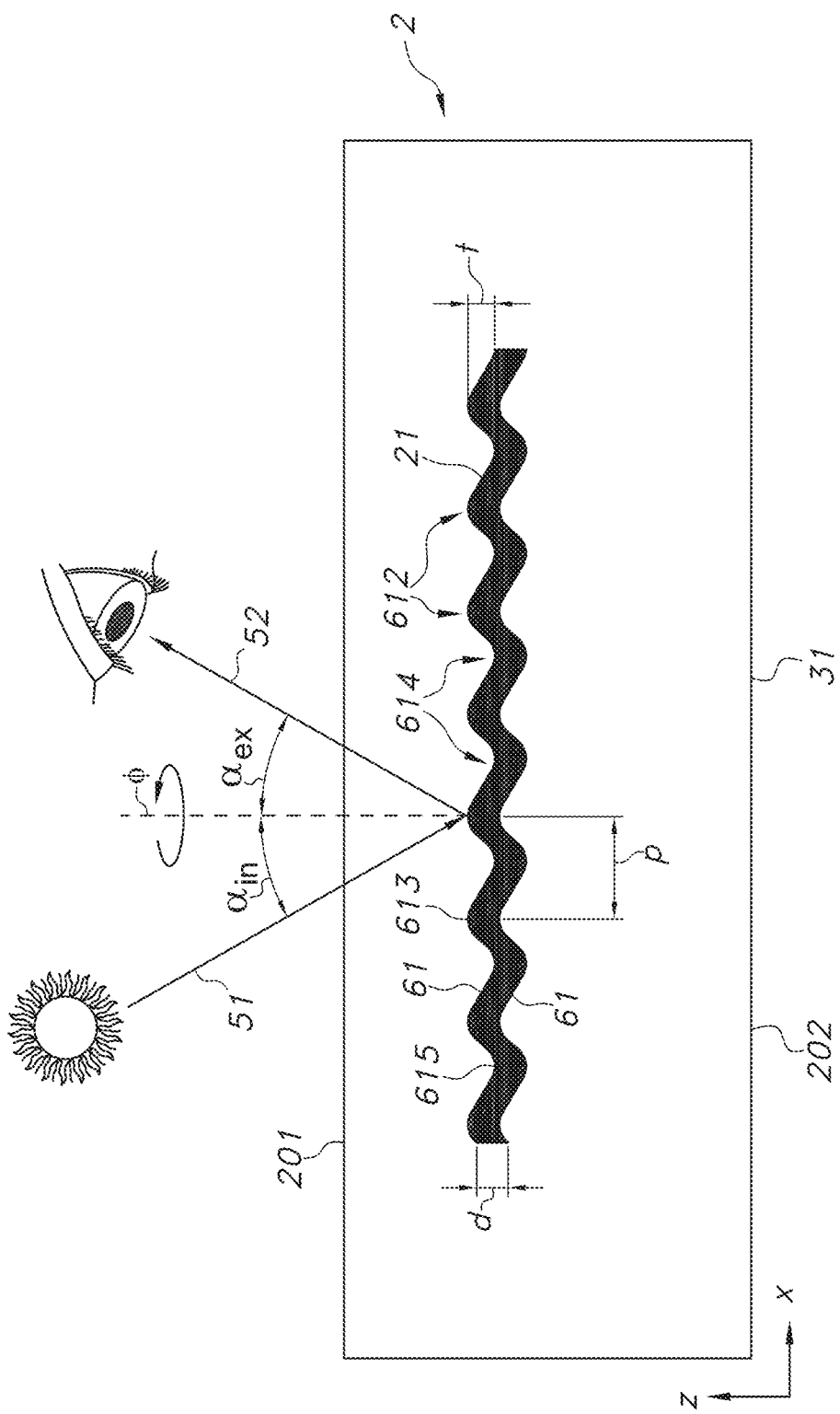
FIG. 2 shows a schematic sectional representation of a cut section of a security element.

FIG. 2 shows a cut section of the security element 1 which has an upper side 201 and an underside 202. Further, the security element 2 has a metal layer 21—optionally also only partially provided—in the surface of which facing the upper side 201 a relief structure 61 is molded and/or in the surface of which facing the underside 202 a relief structure 61 is molded. As shown in FIG. 2, the relief structure 61 here is preferably molded in both surfaces the metal layer 21.

In addition to the metal layer 21, the security element 2 preferably also has one or more layers not shown in FIG. 2, for example a replication varnish layer, one or more varnish layers, one or more adhesion-promoting layers and one or more further decoration layers.

The upper surface of the metal layer 21 preferably forms the upper side 201 of the security element 2, or the one or more layers of the security element 2 which are provided between the upper side 201 and the metal layer 21 are formed—at least in the areas 31—transparent or translucent and, at least in the areas 31, preferably have a transmittance in the wavelength range visible to the human eye of more than 30%, in particular more than 50%, preferably of more than 80%.

During the production of the security element 2, a preferably transparent replication varnish layer is applied for example to a preferably transparent carrier film, optionally with a preferably transparent adhesion-promoting layer interposed. A surface relief is then molded at least in areas into the replication varnish layer by means of UV replication or by means of heat/pressure. The relief structure 61 here is molded as first relief structure in the areas 31 and 32, and optionally the above-described second relief structures are molded in the areas 41 and 42. The metal layer 21 is then applied for example by means of vacuum vapor deposition and optionally structured patterned by means of a demetallization method. Then, a preferably transparent protective varnish layer and/or adhesive layer is optionally applied. Further, it is also possible for another one or more further layers to be introduced into the security element 2 during the manufacture of the security element 2, as already stated above.

The relief structure 61, in at least one direction determined by an allocated azimuth angle, has a sequence of elevations 612 and depressions 614, the elevations of which follow on from each other with a period P which is smaller than a wavelength of visible light. The relief structure 61 has a relief depth t which is determined by the spacing of the maxima 613 of the elevations 612 of the relief structures 61 from a base surface, which is defined by minima 615 of the depression 614 of the relief structure 61, relative to a direction perpendicular to this base surface.

The following relationship results from the diffraction equation, wherein m stands for diffraction order (m=0, +1, +2, . . . ), θm for the angle of the diffraction and θinc for the angle of the incident light:

$$\frac{m\lambda}{P} = \sin\theta_m + \sin\theta_{inc}$$

If P<λ (and m does not equal 0), the following results from this in the case of perpendicular light incidence:

$$|\sin\theta_m| = \left|\frac{m\lambda}{P}\right| > 1$$

It can be seen from this that in the case of a period P which lies between λ and λ/2, in almost all observation situations, a diffraction of the light in higher diffraction orders no longer takes place and if P<λ/2 a diffraction in higher diffraction orders takes place for no more angles, with the result that "classical" diffraction phenomena are only of secondary importance.

The relief structure 61 is now chosen such that the period P is chosen to be in the range between 200 nm and 500 nm, in particular between 220 nm and 400 nm and preferably in the range between 220 nm and 350 nm. The depth t of the relief structure 61 is preferably chosen to be between 80 nm and 500 nm, in particular between 100 nm and 400 nm and particularly preferably between 150 nm and 300 nm.

The metal layer 21 preferably consists of aluminum, copper, gold, silver, chromium or an alloy with these metals.

The thickness of the metal layer d is preferably chosen to be between 10 nm and 100 nm, in particular between 15 nm and 80 nm and particularly preferably between 20 nm and 50 nm.

The relief structure 61 is preferably formed by a linear grating, a cross grating, a hexagonal grating, a circular grating or still more complex grating shapes.

The color impression or color effect of the relief structure 61 is visible in direct reflection, i.e. in mirror reflection or on the condition that αin=αex, αin is the angle of the incident light 51 and αex is the angle of the direct light 52, relative to the surface normals of the base surface 616, as shown in FIG. 2. Preferably, through a corresponding choice of the relief depth t and the profile shape of the relief structure 61, a clearly recognizable color change is further also generated if the angle of incidence and that of emergence are changed at the same time from for example 10° to 30°. Such color changes are also easily verifiable by laypeople and in particular are also easily recognizable in diffuse light. Sometimes a change from one color (e.g. red) to another (e.g. green) occurs, sometimes a change from an intense color in particular with a high color saturation (e.g. dark yellow) to a weak color in particular with a low color saturation (e.g. light yellow) occurs and sometimes a color changes to a silver, in particular achromatic, color impression.

The profile shape of the relief structure 61 is preferably chosen such that the edges in the reflection spectrum are relatively strong, in particular have a change in the reflectance of more than 10%, preferably of more than 15%, over a wavelength range of 50 nm. The average pitch of at least one edge or flank in the reflection spectrum is therefore preferably greater than 2%/10 nm over a wavelength range of at least 50 nm. Furthermore, the reflection spectrum preferably has a first area with a width of at least 50 nm, with a reflectance below 15%, preferably below 10%, and a second area with a width of at least 10 nm and a width of at most 200 nm (reflection edge), with a reflectance which is at least twice as high, preferably 2.5 times higher, than in the first area. Further, the second area is at least 20 nm wide, preferably at most 150 nm wide.

100% reflection here is preferably defined as the measured reflectance of the metal layer at a smooth, i.e. unstructured, boundary surface, with otherwise the same framework conditions (such as e.g. metal layer embedded or at surface etc.).

Figure 4A:
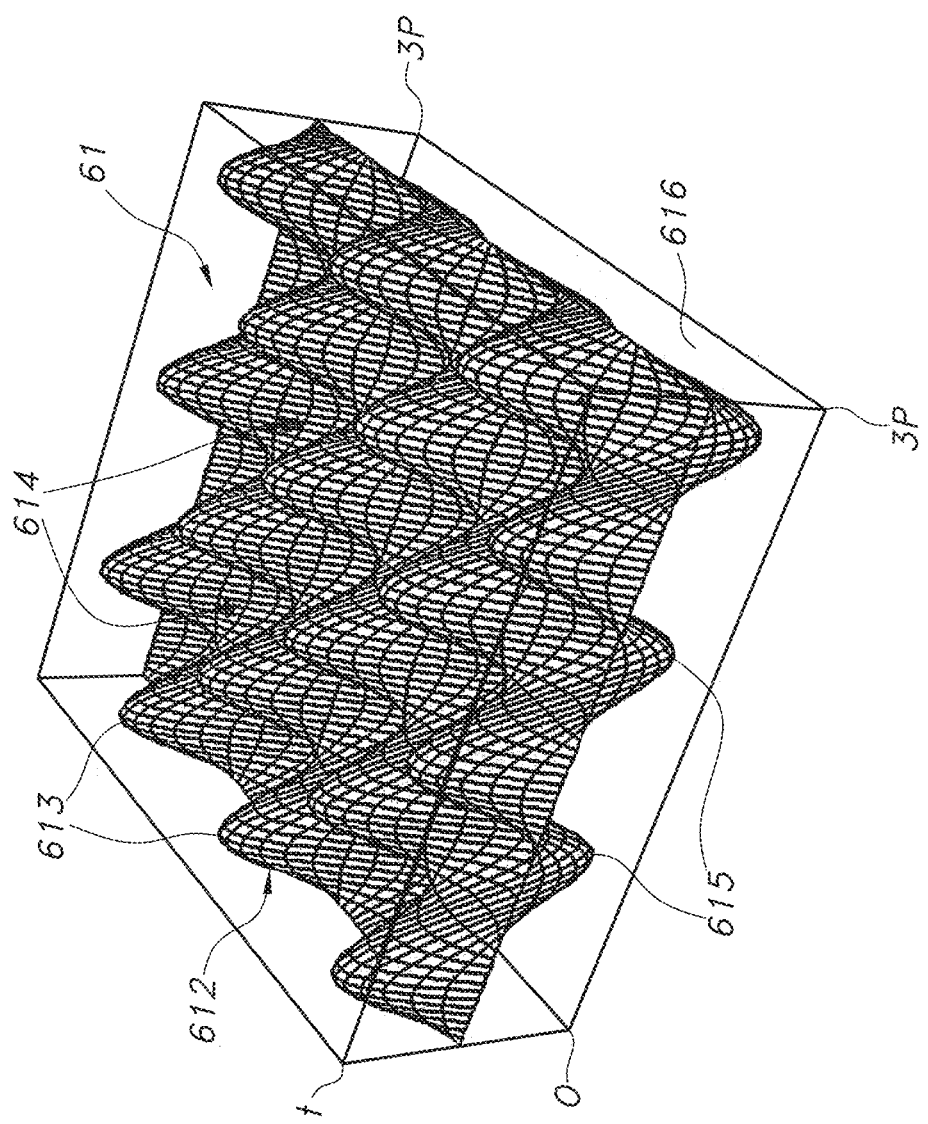
FIG. 4a shows a schematic representation of a relief structure.

It has now surprisingly been revealed that the profile shape of the relief structure 61 is of decisive importance to achieve clearly visible color impressions in direct reflection. This is now explained in more detail below with reference to FIG. 4*a* to FIG. 4*g*:

FIG. 4*a* shows a schematic 3D view of a relief structure 61 in the form of a cross grating with a period P in an x direction and a y direction perpendicular to the x direction of for example in each case 350 nm as well as a relief depth of for example 200 nm. The relief structure 61 shown in FIG. 4*a* thus has a sequence of elevations 612 and depressions 614 in the x direction and in the y direction. The distance between the maxima 613 of the elevations 612 and the minima 615 of the depressions 614 defines the relief depth here. The maxima 613 of the elevations 612 here represent in each case the highest point or, if the elevations have a flat surface at their highest point, represent the highest points of the elevations 612 613. The minima 615 of the depressions in each case represent the lowest point of the depressions or the lowest points of the depressions.

Here, low and high are relative to a top view observation of the surface of the metal layer 21 into which the relief structure 61 is molded, i.e. here are relative to an observation from the upper side of the security element 2. In this sense, FIG. 4*a* shows a top view of the upper side of the metal layer 21 of the security element 2.

A base surface 616, which is a flat surface in the case shown in FIG. 4*a*, is further defined, as shown in FIG. 4*a*, by the minima 615 of the depressions. However, it is also possible for the base surface 616 not to be formed by a flat surface, but rather to be formed, for example, by a coarse structure or a mat structure or a bent or curved surface, as also explained thoroughly later.

Figure 4B:
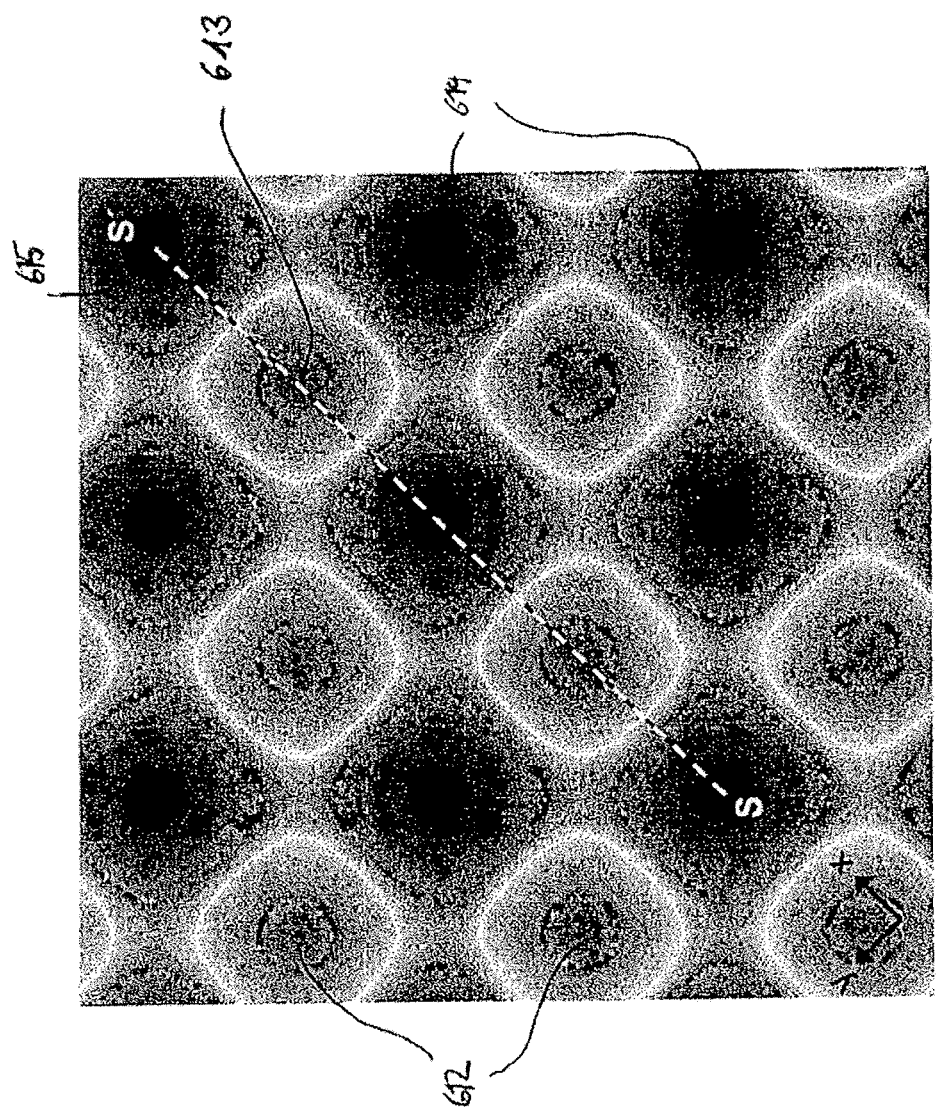

FIG. 4*b* shows a schematic top view of the relief structure 61 according to FIG. 4*a* with the elevations 612, the depressions 614, the maxima 613 of the elevations 612 and the minima 615 of the depressions 614. Further, in FIG. 4*b*, on the coordinate axes x and y are drawn in, which describe the directions in which the elevations 612 and depressions 614 follow on from each other.

Figure 4C:
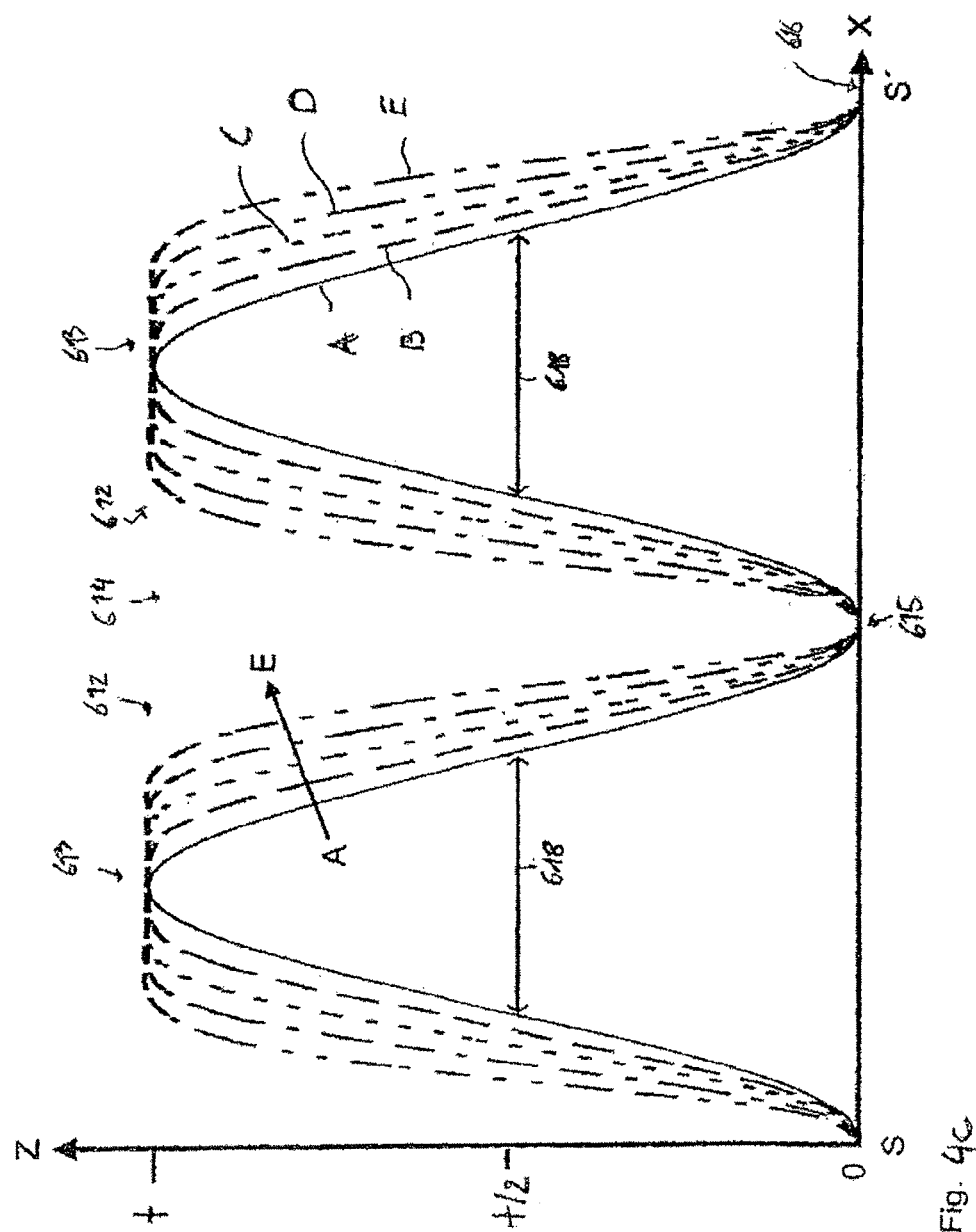
FIG. 4c shows a schematic sectional representation of a relief structure.
Figure 4D:
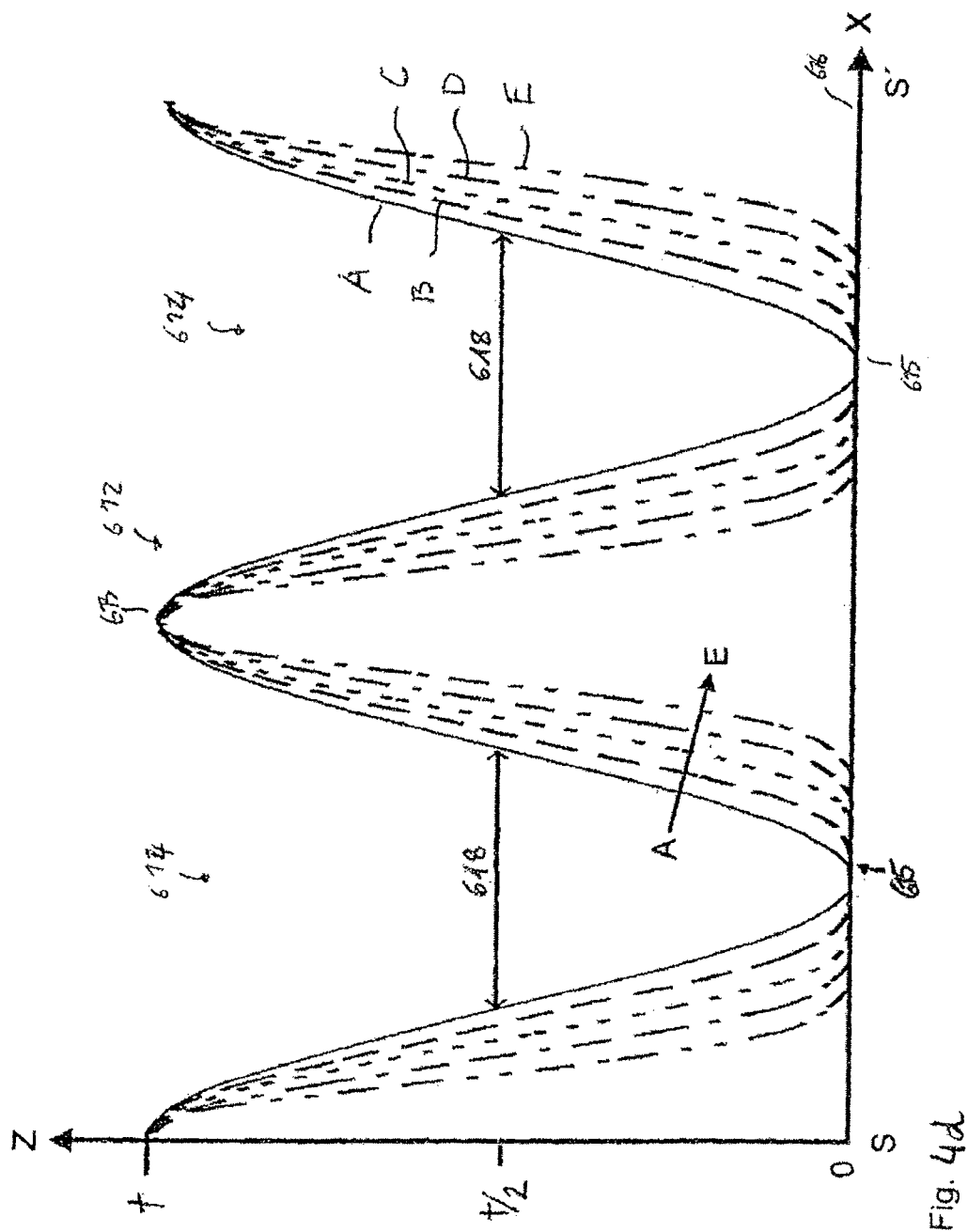
FIG. 4d shows a schematic sectional representation of a relief structure.

FIGS. 4*c* and 4*d*, as well as FIG. 4*f* and FIG. 4*g* now illustrate a cut through the relief structure 61 according to FIG. 4*a* and FIG. 4*b* along the cut line S-S' illustrated in FIG. 4*b*.

In FIG. 4*c* and FIG. 4*d*, as well as FIG. 4*f* and FIG. 4*g*, in each case a cut section from the relief structure 61 according to FIG. 4*a* and FIG. 4*b* with several elevations 612 and depressions 614 is shown, in a cut plane perpendicular to the base surface 616 and running along the line S-S'.

As shown in FIG. 4*c* and FIG. 4*d*, the elevations 612 have maxima 613 and the depressions 614 have minima 615. Further, in FIG. 4*c*, the width 618 of the elevations 612 is drawn relative to a distance t/2 from the base surface 616 and, in FIG. 4*d*, the width 618 of the depressions 614 is likewise drawn relative to a distance t/2. Both correspond to the "full width half maximum" (FWHM).

Surprisingly, it has now been shown that profile shapes which are asymmetrical in relation to a specular reflection at the base surface 616, and thus, in particular, as already explained above, with their profile shape reflected at the base surface, differ by more than only one phase offset, produce much stronger, and aesthetic, color impressions for the human eye than symmetrical profile shapes. Symmetrical profile shapes in this sense are characterized by a mirror symmetry in the base surface 616, i.e. in the embodiment example according to FIG. 4*a* to FIG. 4*d* by a mirror symmetry in the x/y plane. The profile shape remains the same in the case of such a relief structure with such a specular reflection, the relief structure is only shifted by half a period (see sinusoidal profile A in FIGS. 4*c* and 4*d*). The optical effects in the case of observation from the two sides (under the same angle and illumination conditions) are thus the same in the case of these symmetrical profile shapes, if the metal layer 21 is embedded on both sides in a material with the same refractive index. Asymmetrical profile shapes in this sense do not have this mirror symmetry in the base surface 616 or x/y plane. The profile shapes clearly differ in the case of observation from the two sides (see e.g. profile E in FIGS. 4*c* and 4*d*). For example, such a relief structure consists of an arrangement of narrow peaks with wide valleys when observed from one side and of wide hills with narrow, deep valleys when observed from the other side. It has surprisingly been shown that the thus-formed "plateaus", in respect of the generation of plasmons, have a similar action to holes in a metal layer, which is probably how the advantages over symmetrical profile shapes are achieved. To determine the symmetry of a relief structure, the relief structure is thus reflected at the base surface 616 or at the x/y plane and then it is checked whether the profile shape is still identical, i.e. corresponds to the unreflected profile shape, and thus the relief structure remains identical except for a shift by half a period. Experiments and theories (calculations on the basis of so-called rigorous diffraction) have shown that the optical behavior of such asymmetrical gratings differs when the grating is observed from the two sides.

Further, it is advantageous if the width of the elevations 612 or depressions 614 of the relief structure, relative to a distance of t/2 from the base surface, is at least 0.6×P, preferably at least 0.7×P, or at most 0.4×P, in particular at most 0.3×P. This is explained in FIG. 4*c* and FIG. 4*d* in respect of relief structures 61 with several profile shapes A to E.

FIG. 4*c* now illustrates the width 618 of the elevations 612 relative to a distance t/2 from the base surface 616. As shown there, the width 618 of the elevations 612 here is ascertained in the direction of the sequence of the elevations 612 and depressions 614, at a distance t/2 from the base surface 616. The profile shape A has a width 618 of 0.5P, the profile shape B a width of 0.57×P, the profile shape C a width of 0.63×P, the profile shape D a width of 0.69×P and the profile shape E a width of 0.75×P. The profile shape A represents a profile shape which is mirror-symmetrical in respect of a specular reflection at the base surface 616 or x/y plane and which, as set out above, is preferably not to be chosen here. The profile shapes B to E represent profile shapes which are asymmetrical in the above sense and which are preferably chosen.

FIG. 4*d* shows a corresponding formation of relief structures 61 with profile shapes A to E, wherein here the profile shapes A to E are determined by a corresponding width 618 of the depressions 614 relative to a distance of t/2 from the base surface 616.

It has now been shown that the width 618 is preferably to be chosen to be 0.6×P or 0.4×P, in particular 0.7×P or 0.3×P, in order to generate color impressions and/or color effects that are particularly aesthetically clear to the human eye. Further, the width 618 is preferably to be chosen to be in the range of from 0.9×P to 0.6×P or 0.1×P to 0.4×P, further preferably from 0.85×P to 0.7×P, or 0.15×P to 0.3×P.

Figure 4E:
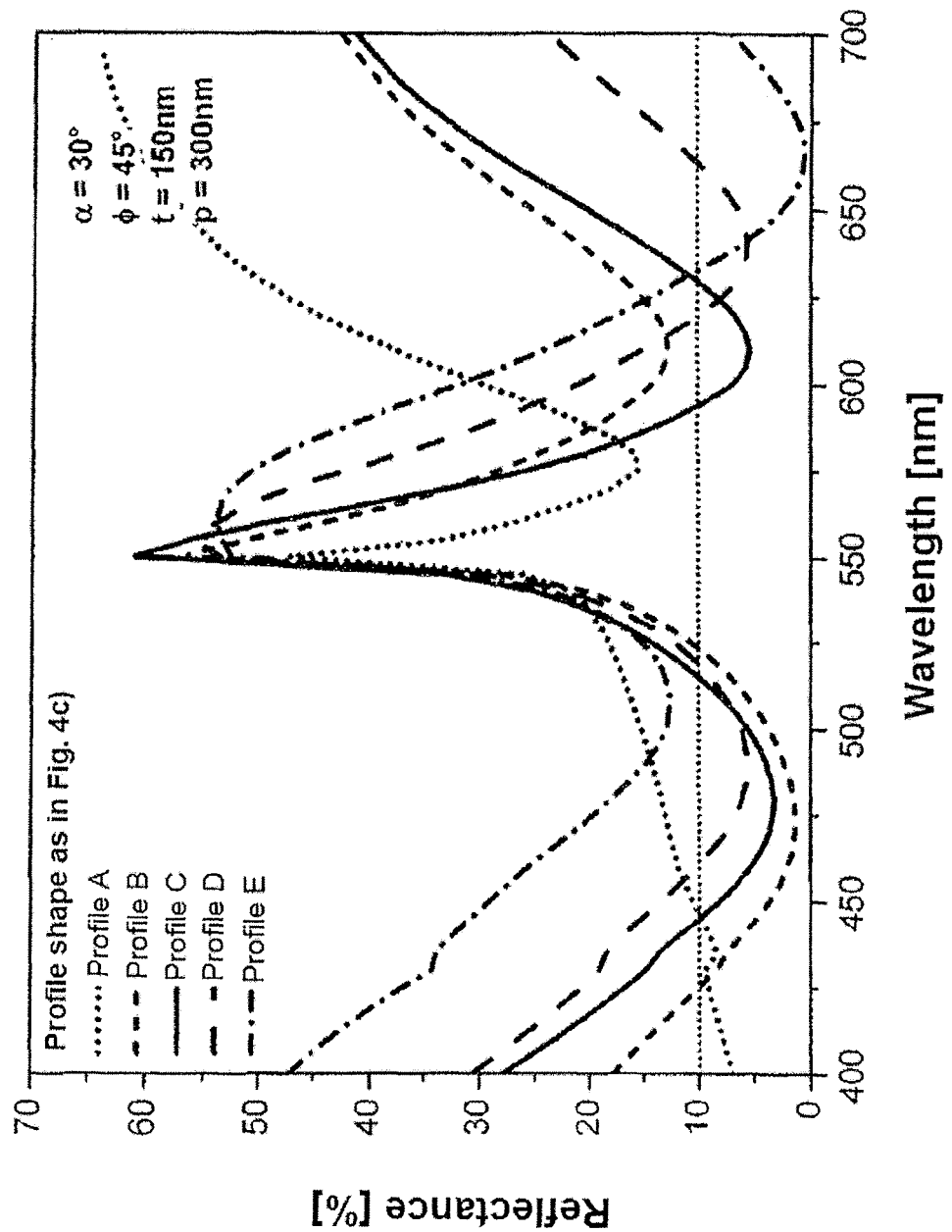
FIG. 4e shows a diagram to illustrate the reflection behavior of a metal layer with a relief structure molded in a surface.

Calculations based on so-called rigorous diffraction with the profile shapes A to E from FIG. 4*c* yielded the reflection spectra represented in FIG. 4*e* for an example of a cross grating with the following parameters and illumination conditions: P=300 nm, t=150 nm, α=30°, φ=45°.

As can be seen, the reflectance of the symmetrical profile shape A lies clearly above 10% almost in the entire visible spectral range. This results in a light, low-contrast color impression. Furthermore, the reflection peak at approx. 550 nm is formed very narrow. The color impression is a relatively light yellow.

As the width 618 of the profile shape increases—and thus as the asymmetry increases—the reflection spectrum changes significantly. The reflection peak becomes wider and the reflection minima become lower (reflectance<10%), which is necessary for a high-contrast color. The profile shape C shows low reflection minima with up to only 3% reflection for example on both sides of the peak at approx. 550 nm, which leads to a clear and strong green color impression. The asymmetrical profile shapes are therefore preferred.

FIG. 4f and FIG. 4g also each show two further examples of asymmetrical profile shape variants (dashed and continuous lines), the profile shapes F, G, H and I. The dashed profile shapes F and H have been shifted in the z direction for better clarity. FIG. 4f shows examples of profile shapes F and G with pronounced peaks at the elevations 612. FIG. 4g shows asymmetrical profile shapes with a narrow plateau at the elevations 612.

Further, it has surprisingly also been shown that a clearly recognizable color impression and/or color effect can also be achieved in transmission by means of the molding of the relief structure 61 into a metal layer. This is illustrated below with reference to FIG. 3.

Figure 3:
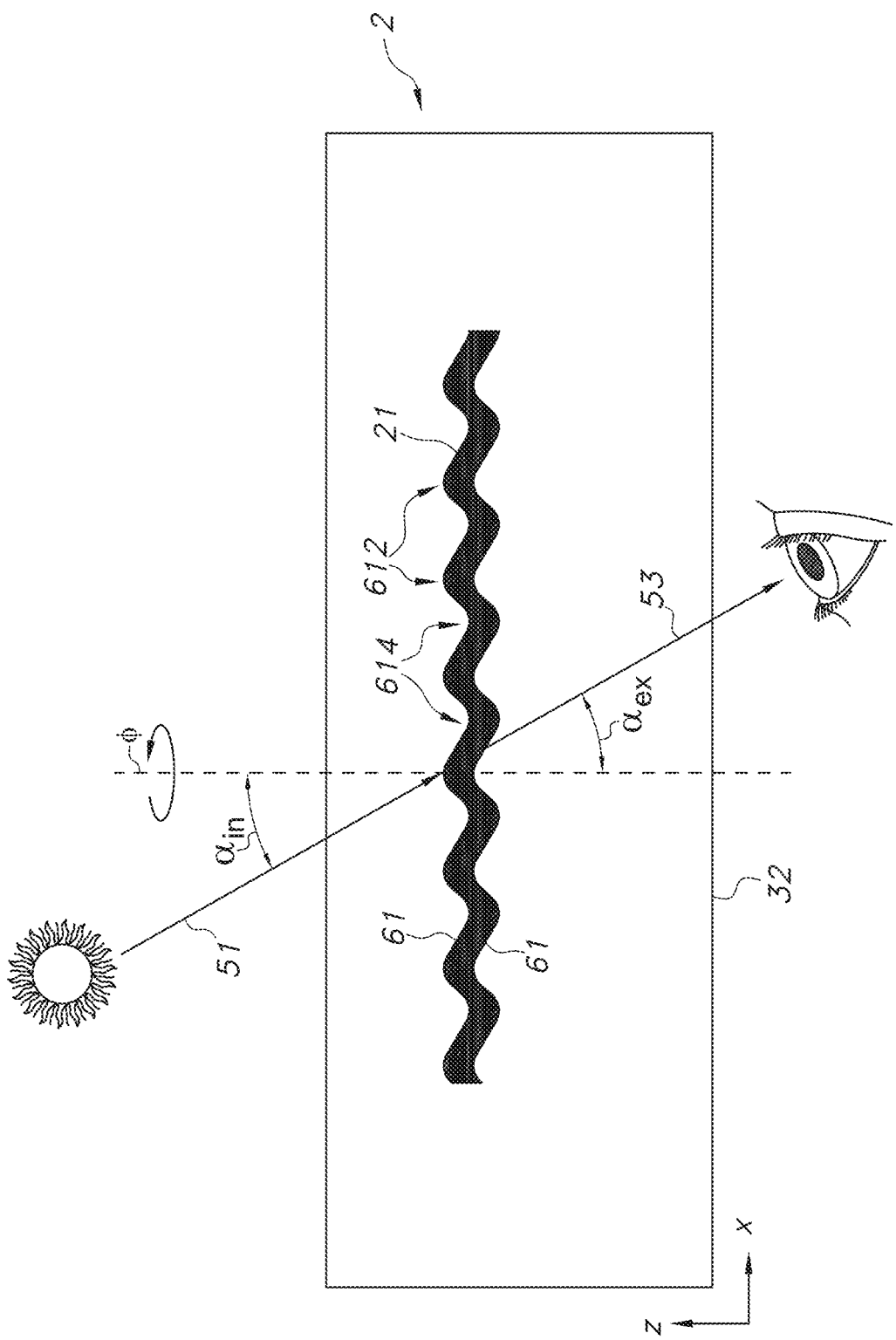
FIG. 3 shows a schematic sectional representation of a cut section of a security element.

FIG. 3 shows a cut section of the security element 2 in the area 32. The security element 2 is constructed like the security element 2 according to FIG. 2 and thus has the metal layer 21 and the relief structure 61 which is molded into the upper surface and/or under surface of the metal layer 21 and which, as already explained above with reference to FIG. 2 and FIG. 4a to FIG. 4d, consists of a sequence of elevations 612 and depressions 614.

In contrast to the embodiment example according to FIG. 2, here the metal layer 21 is chosen such that the metal layer has an optical depth OD in the range of from 0.5 to 2.5, in particular from 0.7 to 2.3 and particularly preferably from 1.0 to 2.0.

The unit of optical depth (OD) here is ascertained relative to an unstructured and thus smooth surface (corresponds to a mirror surface). The following relationship exists here between the optical depth OD and the transmittance T:

$$T = 10^{-(OD)}$$

An algorithmic relationship thus exists between optical depth and transmittance T. An optical depth of 1.0 corresponds to a transmittance of 10% and an optical depth of 2.0 corresponds to a transmittance of 1%.

It has surprisingly been shown that the color impression or the color effect of the relief structure 61 is visible in direct transmission, i.e. is visible on the condition that αin=αex or the incident light and the emergent light lie on one line (disregarding the light refraction inside the security element 2), wherein αin is the angle of the incident light 51 and αex is the angle of the transmitted light 53 relative to the surface normal of the base surface 616.

Here too, the relief depth t and the profile shape are preferably chosen such that a clearly recognizable color change is recognizable when the angles of incidence and of emergence are changed at the same time, for example are changed from 0° to 20°. Such color changes are also easily verifiable for a layperson.

It is surprising that such an effect occurs in transmission in the case of a metal layer and furthermore also that much more light in a spectral range of the incident light is transmitted through areas of the metal layer 21 which are covered with the relief structure 61 than through an area with mirror surfaces or also with "normal" holographic gratings. This difference in the transmittance results even though the mass density of metals is the same in all areas. The relief structure 61 has the effect that a spectral area of the visible light is preferably, i.e. with a higher intensity, transmitted through the metal layer 21, whereby the transmitted light appears colored. The transmission spectrum here is dependent, among other things, on the period P and the relief depth t, the profile shape, as well as on the angle of illumination and the observation angle. The transmission spectrum, and thus also the color impression, can change both in the case of tilting (i.e. in the case of rotation about an axis lying in the plane spanned by the multilayer body) and in the case of turning of the security element 2, whereby the easily verifiable effects already described above result.

The reason for the selectively increased transmittance in the area 32 of the relief structures 61 probably lies in the excitation of plasmons by the incident light. An electric field with increased field strength hereby forms in the immediate vicinity of the metal layer. The plasmons at the "upper boundary surface" of the metal layer 21 excite plasmons at the "lower boundary surface" and, through this coupling, increase the transmission of the transmitted light. Through a corresponding choice of the layer thickness of the metal layer, it is brought about that such a coupling results and thus light can be "channeled" through the metal layer 21.

Both in transmission and in reflection, it has been shown here that the following effects can be achieved by the modification of the parameters of the relief structure 61:

It has transpired that the colors and color effects generated in direct reflection or transmission strongly depend on the period P of the relief structure 61. As the period P increases, the reflection peak or the reflection edge or the transmission peak and the transmission edge shift to larger wavelengths in the reflection or transmission spectra.

Figures 5A, 5B:
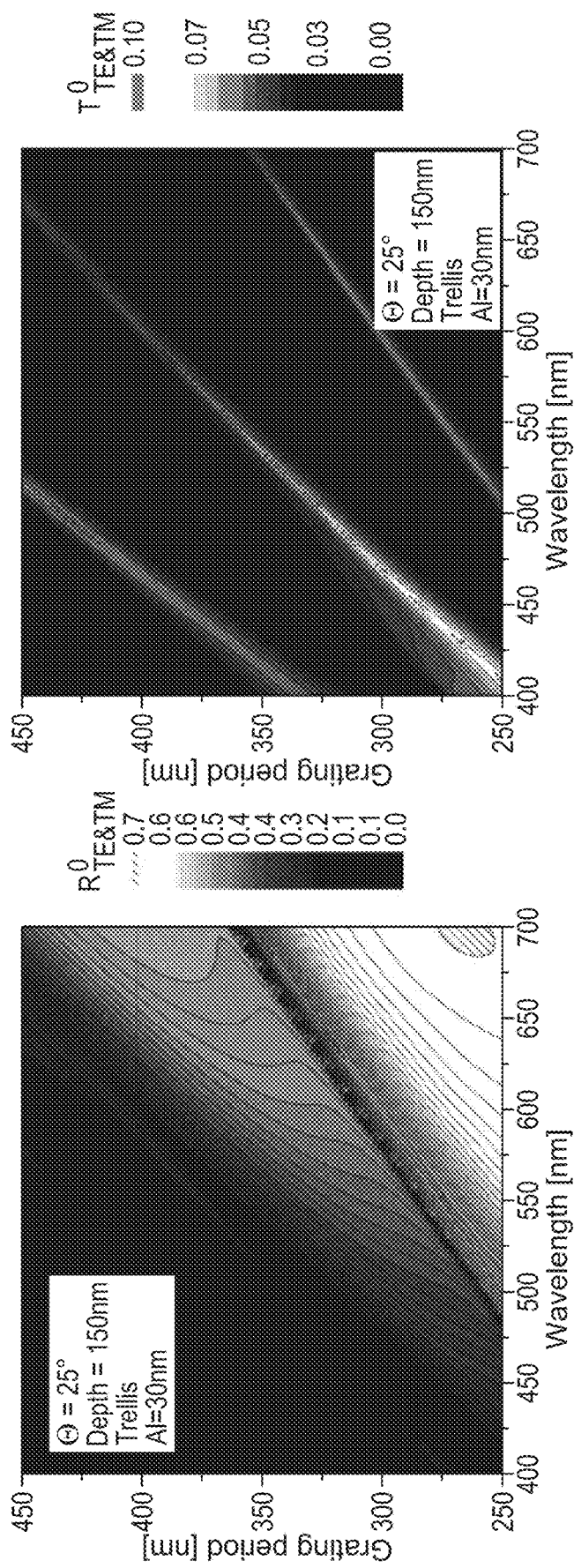
FIGS. 5a to 5g show diagrams to illustrate the reflection behavior or transmission behavior of a metal layer with a relief structure molded into a surface.

FIG. 5a and FIG. 5b show simulation data calculated on the basis of so-called rigorous diffraction, for the reflected (R0) and, respectively, transmitted (T0) intensity as a function of the wavelength λ and the period P. The simulation data are averaged over the TE and TM polarization and thus correspond to the case of unpolarized illumination and observation. The symmetrical profile shape A was used. The (relatively slowly increasing) high-pass edge of the reflection correlates to peaks in the transmission. In FIG. 5a and FIG. 5b high intensity is represented light and low intensity is represented dark. The lightness scale is represented from 0 to 70% for reflection and from 0 to 10% for transmission.

Figure 5C:
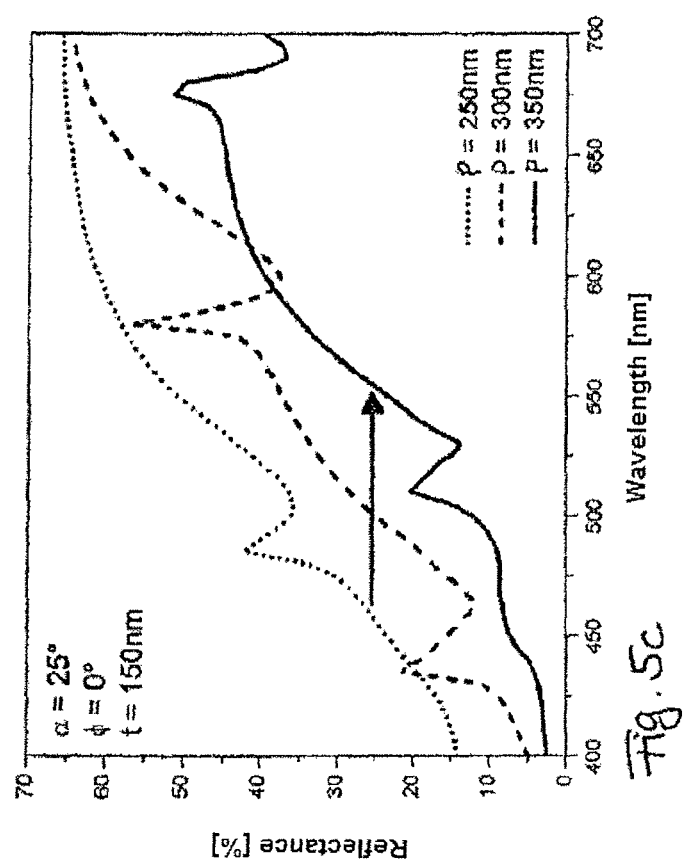

FIG. 5c now shows a corresponding diagram for three simulated reflection spectra for the periods P=250 nm, P=300 nm and P=350 nm. As is revealed in the three reflection spectra outlined in FIG. 5c, the reflection edge in the three periods represented moves over the visible spectral range and shifts by approximately 80 nm from the period 250 nm to period 350 nm. However, the shape of the spectra also changes as the period increases.

The period P can thus be used to set a particular color impression. For an optimization of the color contrast, however, for each period the profile shape and the grating depth are to be adapted. This was not carried out in FIG. 5c, in order to vary only one parameter and to show the peak shift.

Figure 5D:
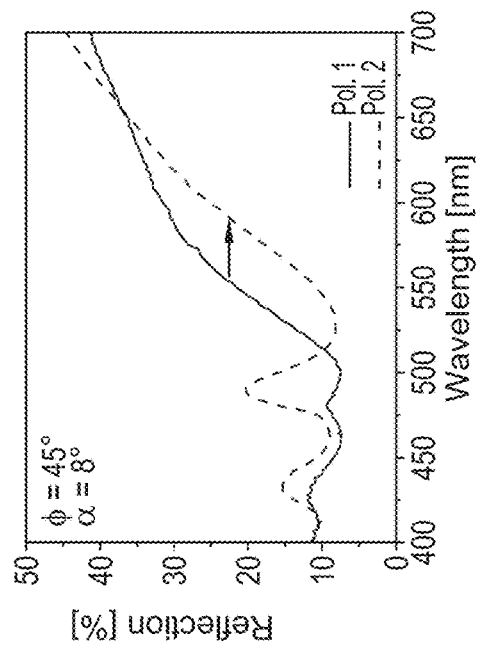
Figure 5E:
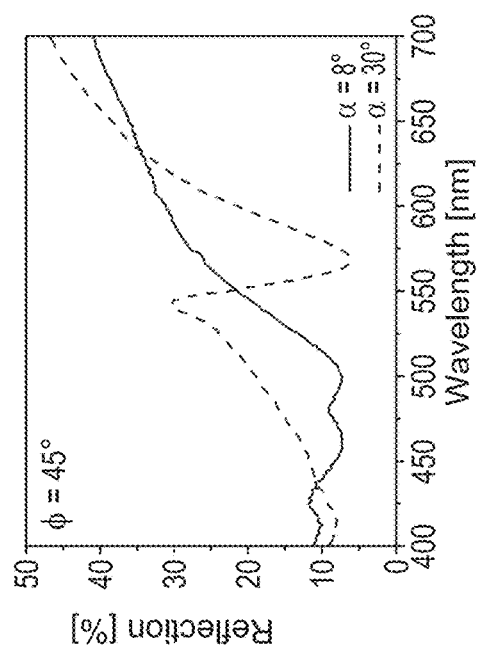
Figure 5F:
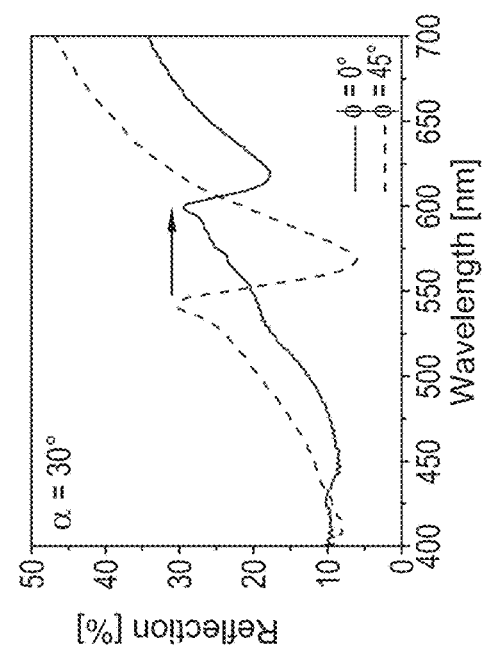
Figure 5G:
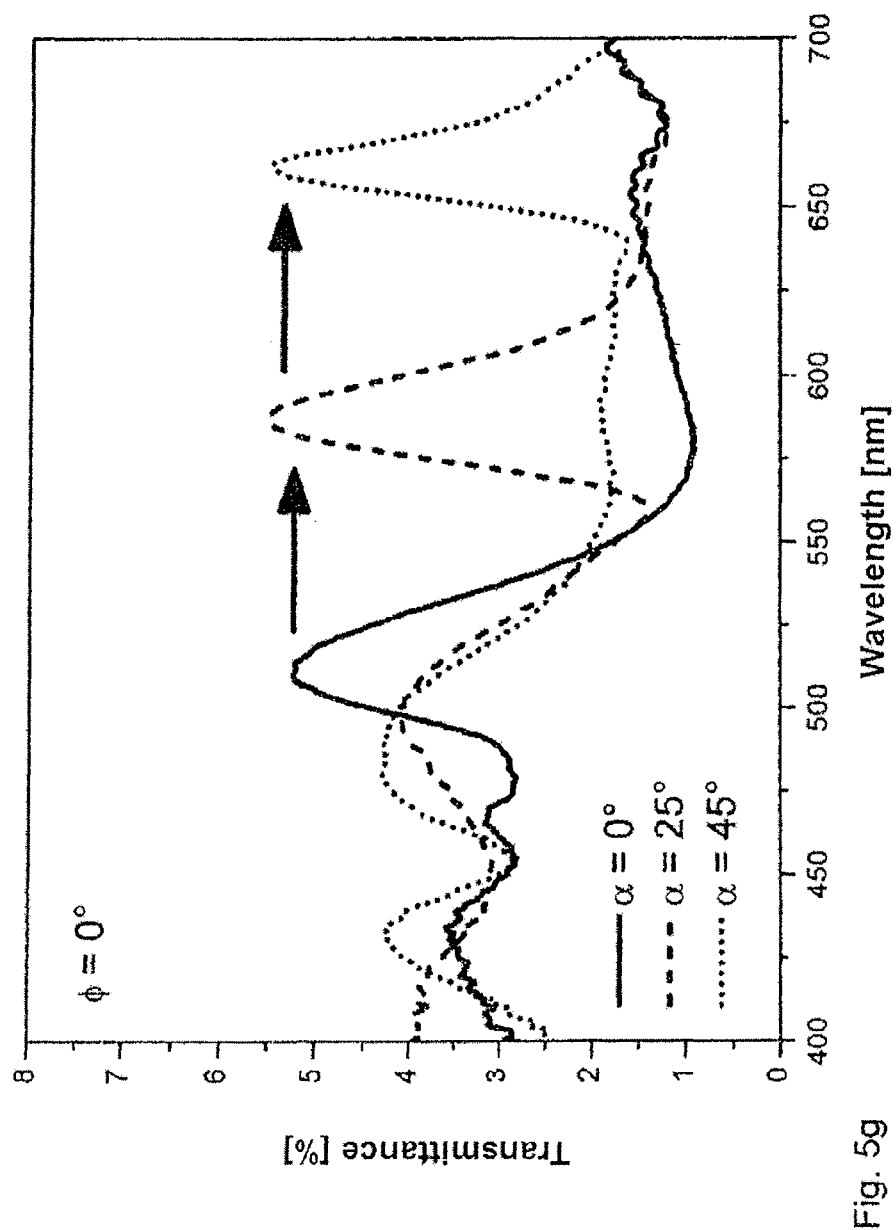

In FIGS. 5d to 5f, the influence of the choice of the parameters of the relief structure 61 on the optical effects appearing in reflection is further illustrated with reference to several examples. FIG. 5g shows the optical effect in transmission. The data in FIGS. 5d to 5g as well as 6c are measured reflection spectra of film models. The spectrometer used, AvaSpec-2048, is from Avantes. The illumination took place using the white-light source LS-1 with a color temperature of 3100° K from Ocean Optics via optical fibers and a measuring head which can be used for different angles of incidence and emergence (i.a. $\alpha=8°$ and $\alpha=30°$). The dark reference was measured against a mat black surface. The light reference (100% defined) for reflection was measured against an aluminum mirror. For transmission, the light incident directly from the illumination fiber into the measuring fiber was used as light reference.

An asymmetrical cross grating with a period P of 300 nm, a grating depth of 150 nm and a width 618 of the depressions 614 of 0.7×P is chosen here as relief structure 61, regarding this see also the statements re FIG. 4a to FIG. 4d. A layer of aluminum with a thickness d=24 nm is used as metal layer 21.

The illumination and measurement of the reflection spectra take place in the x/z plane, i.e. at an azimuth angle $\varphi=45°$. In respect of the definition of the axes, reference is made to FIG. 4a to FIG. 4d. The continuous line shows the measured reflection spectrum in direct reflection at an angle $\alpha=8°$, the dashed line at $\alpha=30°$.

As is recognizable from FIG. 5d, at $\alpha=8°$ the light at a wavelength of approx. 530 nm is reflected ever more strongly as the wavelength increases, while the reflectance below 530 nm largely lies below 10%. This results in a good reddish color impression even under usual observation conditions. The reflection spectrum measured at an angle of incidence of 30° (dashed line), in contrast, shows a reflection peak at a wavelength of approx. 535 nm as well as a reflection edge above 600 nm. This spectrum results in a metallic green color impression.

Further, a security element with such a relief structure 61 also shows a color effect in the case of rotation in the x/y plane, i.e. when the azimuth angle $\varphi$ is changed. This is shown in FIG. 5e. FIG. 5e shows the measured reflection spectra at an illumination and observation angle $\alpha$ of 30°, wherein the dashed line shows the spectrum at a grating oriented by the azimuth angle $\varphi=45°$, i.e. according to the x/z plane, and the continuous line shows the spectrum after rotation through 45°, i.e. at $\varphi=0°$.

As shown in FIG. 5e, a clear shift of the reflection peak from 535 nm to approx. 600 nm is to be recognized. The reflection edge also shifts to larger wavelengths. The color impression changes from metallic green to yellowish.

As the relief structure 61 chosen as set out above is asymmetrical, the color impressions which result in the case of observation from the upper side 201 (pol. 1) and from the underside 202 (pol. 2) also differ as a result. This is shown in FIG. 5f.

FIG. 5f shows two measured spectra at an illumination and observation angle $\alpha=8°$ as well as in the case of a direction of view in the x/z plane ($\varphi=45°$). The continuous line represents the spectrum in the case of reflected light observation from the front side (corresponds to the observation situation according to FIG. 5d) and the dashed line represents the spectrum in the case of observation from the back side (pol. 2). The dashed line has a clear reflection peak at approx. 490 nm. Furthermore, the reflection edge is shifted by approximately 25 nm to higher wavelengths and is somewhat less steeply pronounced. Because of the reflection peak, the color impression in the case of observation from the back side is a less strong red color impression (thus a lighter red) than in the case of observation from the front side. Pol. 1 is preferred in this example.

FIG. 5g shows three measured spectra in transmission. The illumination and measurement of the transmission spectra take place at an azimuth angle $\varphi=0°$. In respect of the definition of the axes, reference is made to FIG. 4a to FIG. 4d. The continuous line shows the measured transmission spectrum in direct transmission at an angle $\alpha=0°$, the dashed line shows this at $\alpha=25°$ and the dotted line shows this at $\alpha=45°$. A clear transmission peak shift from 512 nm via 587 nm to 662 nm is to be recognized. The color impression which these transmission peaks generate is also modified by the other spectral features, e.g. the peaks or plateaus between 450 nm and 500 nm. Overall, these transmission spectra result in a color shift from greenish ($\alpha=0°$) via grayish ($\alpha=25°$) to reddish ($\alpha=45°$).

The color impression both in reflection and in transmission can be significantly modified by an additional HRI layer. Thus, the model according to FIG. 5d shows, instead of the red color impression at $\alpha=8°$, a dark green color impression, if an approx. 60 nm thick HRI layer made of e.g. ZnS borders the aluminum layer on the observation side. The thickness of this HRI layer is preferably in the range of from 20 nm to 80 nm.

Figure 6A:
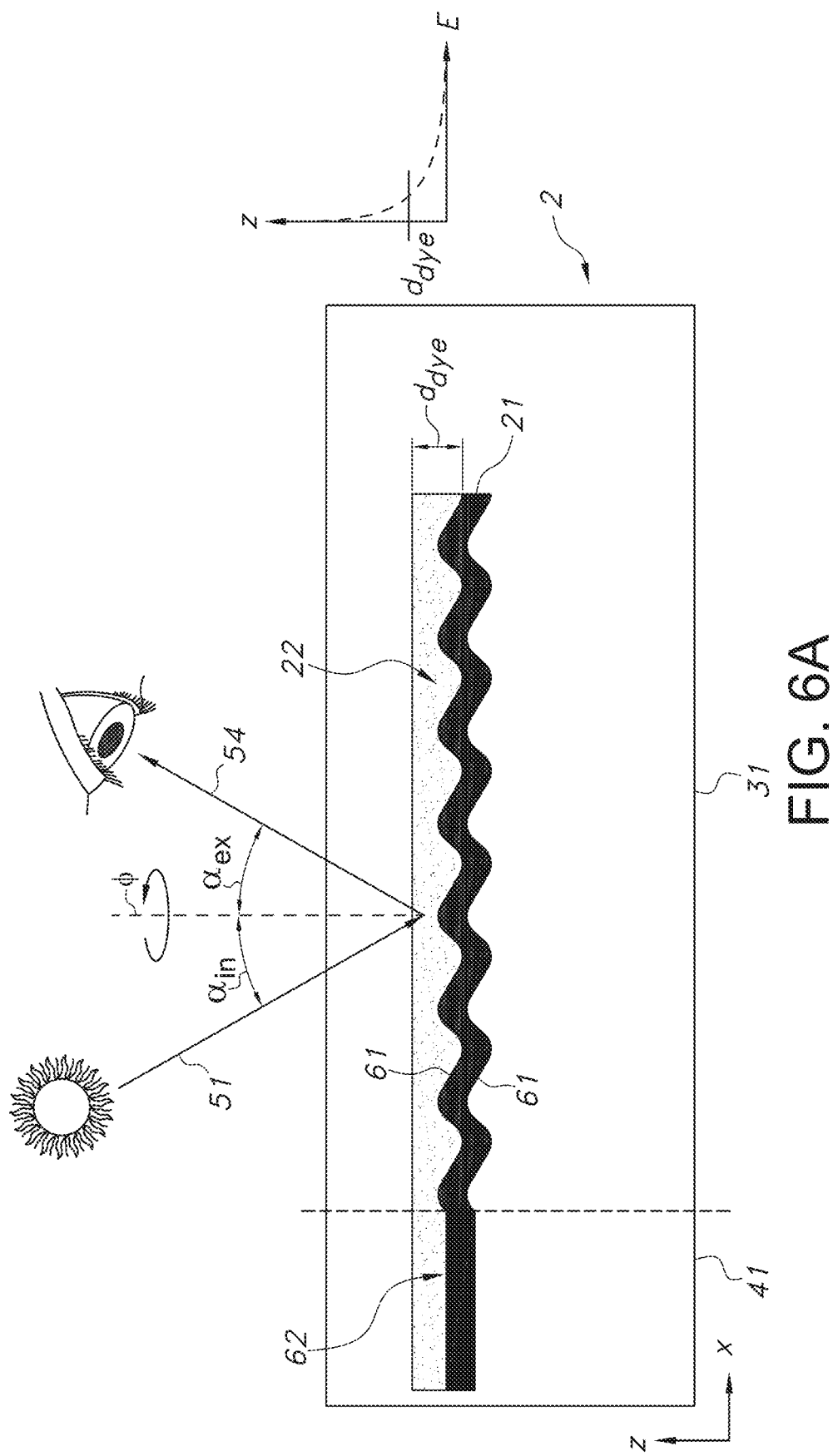
FIG. 6a shows a schematic sectional representation of a cut section of a security element.

FIG. 6a shows a further formation of the security element 2, in which dyes and/or luminescent substances are arranged in the immediate vicinity of the metal layer 21.

FIG. 6a shows the security element 2 with the metal layer 21. In the area 31 the relief structure 61 is molded into the metal layer 21 and a second relief structure 62 or a mirror surface (not shown) is molded in the area 41. In respect of the design of the metal layer 21 and of the relief structure 61 and the layer structure of the security element 2, reference is made to the previous statements according to FIG. 1 to FIG. 5f. The security element 2 according to FIG. 6a furthermore has another layer 22 which contains the one or more dyes and/or luminescent substances.

It has surprisingly been shown that the color impression and/or color effect which is generated by the relief structure 61 as previously described can also be significantly strengthened and also spectrally modified, if a dye and/or luminescent substance is located in the immediate vicinity of the metal layer 21. Immediate vicinity here means closer than 2 µm, in particular closer than 1 µm, further preferably closer than 500 nm, and further preferably closer than 300 nm. The dye and/or luminescent substance here is preferably provided in a dielectric layer of the security element 2 which directly borders the metal layer 21, as shown in FIG. 6a by way of example with reference to the layer 22. The dielectric layer 22 here can be a layer applied to the metal layer 21, in particular formed patterned. However, it is also possible for the dye or luminescent substance to be contained in a layer which is introduced into the security element 2 before application of the metal layer 21. Thus, the layer 22 can be for example a replication varnish layer or a layer applied to a replication varnish layer. It is also possible for the replication varnish layer to consist of a stack of two or more layers, of which only the top layer, which forms the boundary surface to the metal layer 21, is provided with the dye and/or luminescent substance. This has the advantage that the layer 22 can be chosen to be very thin and yet the total thickness of the replication varnish layer lies in a usual thickness range, as has proved worthwhile in production.

Alternatively, the layer 22 can also be vacuum-applied, e.g. vapor-deposited or deposited by means of PECVD.

Dissolved dyes and/or luminescent substances are preferably used as dyes and/or luminescent substances. In particular, the use of metal complex dyes has proved worthwhile. Alternatively, nanoparticles such as e.g. quantum dot (QD) also come into consideration, or also hybrid materials such as e.g. dye-loaded zeolite crystals (such as are described for example in EP 1873202 A1). Further, the use of the following luminescent substances has proved worthwhile: coumarins, rhodamines and cyanines.

The layer 22 to which the one or more dyes or luminescent substances are added is preferably formed very permeable to light. It preferably has a transmittance of at least 70%, in particular of 90%, in the wavelength range of from 400 to 700 nm. For many applications it is important that the transparency of the colored layer 22 is so high that no effect of the dye is recognizable in areas with the structure 62.

Figure 6B:
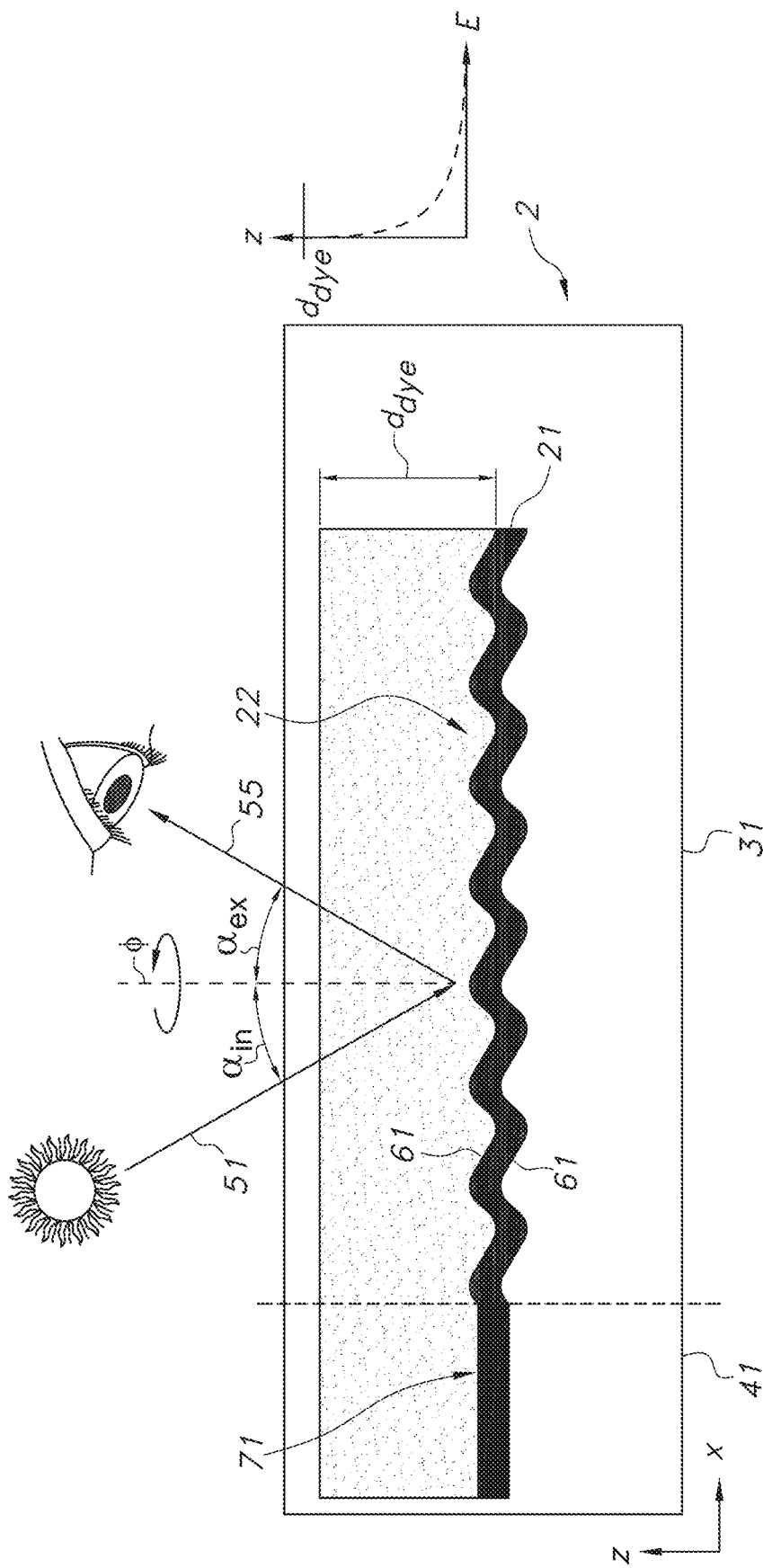
FIG. 6b shows a schematic sectional representation of a cut section of a security element.

It is advantageous here in particular if the dye or luminescent substance is for the most part arranged in the immediate vicinity of the surface of the metal layer 21 in which the relief structure 61 is molded. This is shown in FIG. 6a. It has surprisingly been shown that in an arrangement of luminescent substances and dyes in the immediate vicinity of the surface of the metal layer 21 in which the relief structure 61 is formed the absorption of the dye or the luminescence of the luminescent substance is clearly increased. This is probably to be attributed to the fact that an increased field strength in the near field, i.e. up to a distance of approx. one wavelength of the exciting light, is generated by the plasmons generated by the relief structure 61. The electric field (E field) falls off, as illustrated in FIG. 6a, exponentially with the distance from the surface, i.e. in the z direction. This probably leads to the clear increase in the absorption/luminescence of the dyes or luminescent substances, if these are arranged in the immediate vicinity, as set out above, of the surface of the metal layer 21 in which the relief structure 61 is molded. If the layer 22, as illustrated in FIG. 6a, is thus designed correspondingly thin or the concentration distribution of the dye in the layer 22 is chosen such that it is for the most part arranged in the immediate vicinity of the metal layer, the dyes or luminescent substances of the layer 22 for the most part contribute to the above-named strengthening of the effect, whereby they allow the effects explained in the following to be implemented in a particularly striking manner. FIG. 6b shows the security element according to FIG. 6a, with the difference that here the layer 22 is chosen to be relatively thick. Even if the total amount of dyes in the layer 22 is chosen to be the same in the embodiment examples according to FIG. 6a and FIG. 6b, then in the embodiment example according to FIG. 6b much less dye or luminescent substance is arranged at a distance with increased E field and the strengthened absorption or luminescence only occurs to a small extent, as the dye which is at a distance of more than one wavelength from the surface of the metal layer 21 mainly acts as a "normal" color filter. In the embodiment examples according to FIG. 6a and FIG. 6b, the reflecting light 54 or 55 is correspondingly differently influenced by the dye or luminescent substance.

The layer thickness of the layer 22 is preferably to be chosen to be in the range of from 20 nm to 2 μm, in particular 50 nm to 1 μm and particularly preferably in the range of from 100 nm to 500 nm.

Numerous striking and surprising optical effects can be achieved by the utilization of the above-described effect.

If a dye which has a similar color impression to the relief structure 61 is used, the following effect can be achieved: if for example a red dye is applied to the metal layer 21 in an area with a relief structure 61 which (without dye) has a red color impression in the case of almost perpendicular observation and has a green color impression in the case of tilted observation (for instance at 30°), then the red color impression is clearly strengthened. If the concentration of the red dye in the layer 22 is low enough, then the green color impression remains almost unchanged. Overall, this results in a more strongly visible color tilt effect from red to green. It has been shown that, for this, the concentration of the red dye can be so low that a metallic mirror which is likewise coated with the color layer appears almost unchanged, i.e. without additional color effect or color shade. This has the advantage that the color layer can be applied over the whole surface and need not be applied partially and register-accurate relative to the areas with the relief structure 61.

Alternatively, a yellow dye can also bring about a strengthening both of the red and of the green color impression. In addition, such a yellow dye applied over the whole surface can produce the impression of a gold foil in areas without the relief structure 61 if the concentration of the dye is high enough.

Depending on the selection of the dye, the color impression can thus be modified in a targeted manner.

Optionally, the dye can also have still other additional functions. For example, the dye can have fluorescent properties, which can be examined using a simple laser pointer. If, for example, Lumogen Red is used as dye and the multilayer body is irradiated by a laser pointer with the wavelength 532 nm, then the color of the light spot changes from green (areas without the dye) to yellow (areas with the dye).

Alternatively, the dye is applied, in particular in a higher concentration, only where the structures of the first area have been replicated, or these structures of the first area are replicated (with the usual register tolerances) where the dye is present. A stronger influence on the color effect is thereby possible without at the same time dyeing areas outside the first area recognizably to the human eye.

This is shown by way of example in FIG. 6d: FIG. 6d shows the security element 2 with the metal layer 21 and with several optional further layers, in particular a replication varnish layer, in particular a transparent replication varnish layer, provided underneath the metal layer 21, one or more further layers, in particular transparent further layers, for example a replication varnish layer, one or more varnish layers and an adhesion-promoting layer. In the area 31 the relief structure 61 is molded into the metal layer 21, and a second relief structure 62 or a mirror surface is molded in the area 41. In respect of the design of the metal layer 21 and of the relief structure 61 and the layer structure of the security element 2, reference is made to the previous statements according to FIG. 1 to FIG. 5f. The security element 2 according to FIG. 6a furthermore also has the layer 22 which contains the one or more dyes and luminescent substances. In respect of the design of the layer 22, reference is made to the previous statements, in particular regarding FIG. 6a to FIG. 6c. As shown in FIG. 6d, the layer 22 is only applied to the metal layer 21 in the area 31 and thus only applied to the metal layer 21 in the area in which the relief structure 61 is molded into the metal layer 21.

In addition to the partial application of the dye in the first area, it is also possible to apply the dye in different concentrations inside and outside the first area or to apply two different dyes inside and outside the first area.

By register accuracy or registration accuracy is meant the positional accuracy of two areas of surface and/or layers relative to each other. This positional accuracy is set for example via so-called register marks or registration marks or other technical aids, e.g. optical sensors. Depending on the processes used, the tolerances of the positional accuracy, i.e. the register tolerances, differ in size and can for example range within the range of from a few micrometers to a few millimeters.

If the concentration is chosen to be much higher, then the red color impression of the relief structure 61 is also massively strengthened. In the case of tilted observation, however, the red color impression can then also be present. This corresponds to a stable red color which is only visible in the area of the relief structure 61, thus register accurate relative to the area of the relief structure 61. Thus, for example, the layer 22 can be applied over the whole surface both in the area 31 and in the area 41. As the above-described strengthening effect does not occur in the area 41, if the concentration of the dye and/or luminescent substance in the layer 22 is chosen to be correspondingly low the red color impression is thus not visible or barely visible to the human observer in the area 41, but is visible in the area 31 because of the above-described strengthening effect. Thus, for example, a red color impression can hereby be structured with a much higher register accuracy than is possible by means of a printing method, and can be arranged absolutely register accurate relative to optically variable effects which are generated for example by second or first relief structures.

If, for example, a dye is used which has a different color impression from the relief structure 61, the color impression of the security element 2 is not only strengthened, but also modified. If, for example, a blue dye is applied to a relief structure that appears red, then a strongly purple color impression can be generated.

Further, it is also possible for the color of the dye to be chosen such that it matches the color of the relief structure 61 which is generated at a larger reflection angle (for example $\alpha in=\alpha ex=30°$). The following can hereby be brought about: if, for example, the relief structure 61 brings about a color change in which the two colors have a strongly different reflectivity (wherein, for example, the color at $\alpha in=\alpha ex=0°$ has a much stronger reflection than the color occurring at $\alpha in=\alpha ex=30°$), the color of the dye can be chosen such that it matches the weaker of the two colors. The visibility of the weaker color impression can hereby be improved. Further, it is possible to apply the layer 21 patterned, for example in the form of a logo, a text or an image, and to choose the color of the dye such that it matches the color which appears when the security element 2 is rotated. In this way it can be achieved that, for example, the logo or the image suddenly appears with higher luminous intensity when the security element 2 is rotated.

Figure 6C:
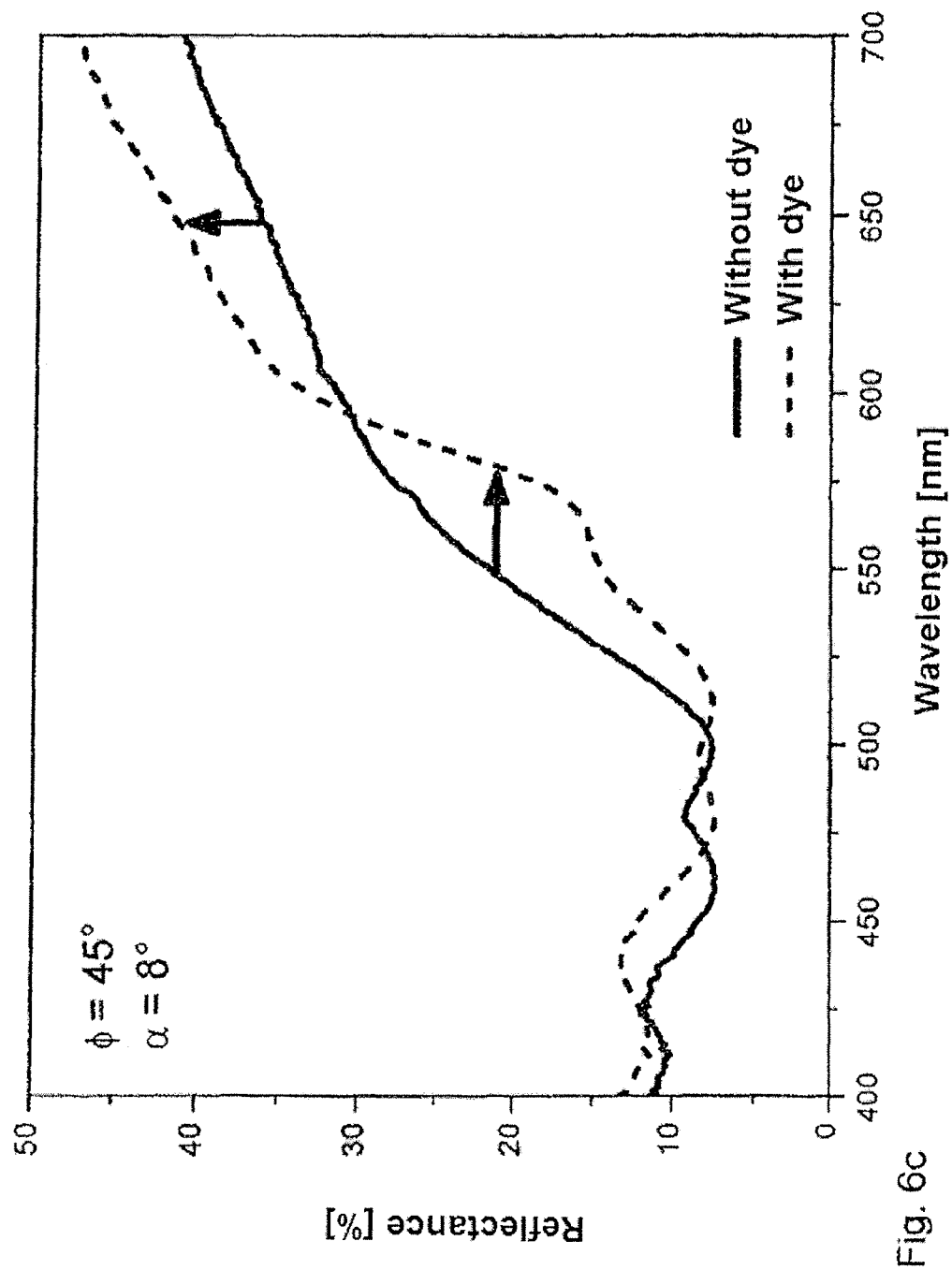

The influence of the layer 22 on the color impression of the security element 2 is further illustrated in FIG. 6c. FIG. 6c now shows the color impression of the security element 2 in reflection without dye (continuous line) and with dye (dashed line) in the case of a design of the relief structure 61 according to FIG. 5a to FIG. 5f. The illumination angle and observation angle are 8°. Here, a dyed polymer layer 150 nm thick was applied to the metal layer 21 made of aluminum. The polymer layer has a red dye, namely Arcotest test ink 42 mN, which is embedded in a matrix of polyacrylic acid and is so strongly diluted that an unstructured area of the metal layer, i.e. a mirror area, appears almost unchanged to the human observer. Further, the transmittance of the polymer layer is chosen such that at least 90% of the incident visible light in the wavelength range of from 400 nm to 700 nm passes through the polymer layer. Nevertheless, the two measured reflection spectra with and without dyes differ markedly, as shown in FIG. 6c. The interaction of the dye with the metal layer with molded relief structure 61 leads, as shown in FIG. 6c, for one thing to a shift of the high-pass edge by approx. 60 nm to higher wavelengths. At the same time, the reflected intensity increases above a wavelength of 600 nm. Overall, a wider reflection minimum and a more strongly pronounced reflection edge form, which results in a stronger red hue. At $\alpha=30°$ (not shown) the reflection edge likewise shifts to larger wavelengths due to the dye. At the same time, the intensity of the reflection peak at approx. 535 nm reduces.

Figure 6E:
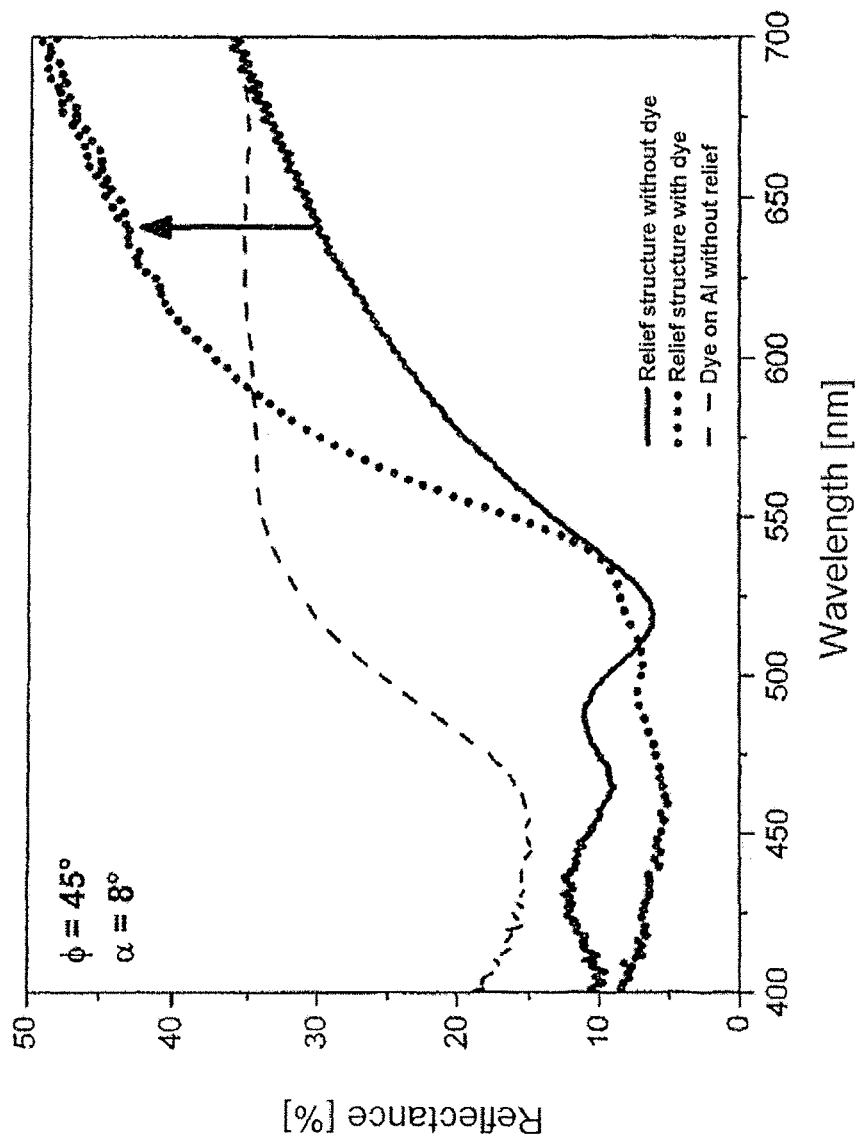
FIG. 6e and FIG. 6f show diagrams to illustrate the reflection behavior of a security element.
Figure 6F:
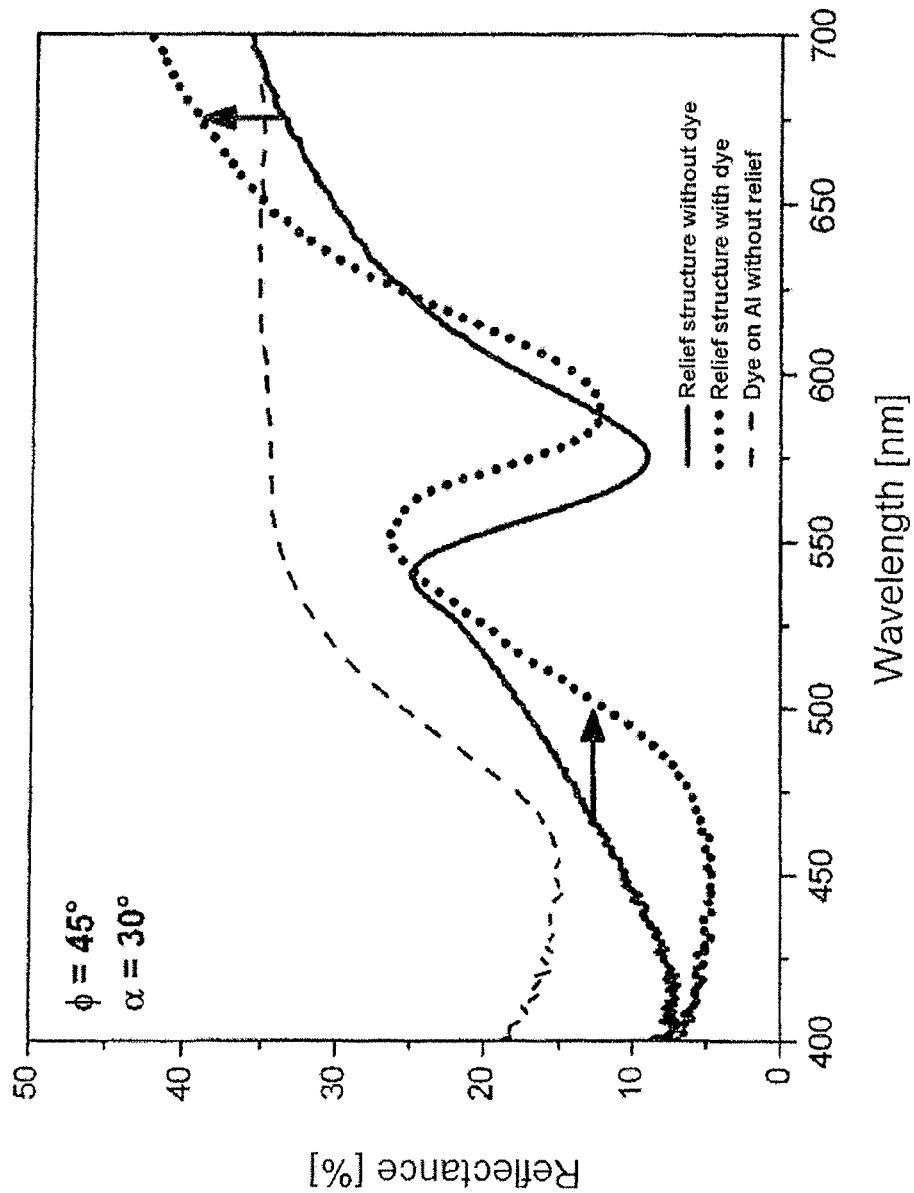

FIGS. 6e and 6f show measured reflection spectra of an example of a security element 2 which is provided with a layer 22 which has a dye in such a high concentration that the security element 2 appears to be dyed. FIGS. 6e and 6f now show the color impression of the security element 2 in reflection without dye (continuous line) and with dye (dotted line) in the case of a design of the relief structure 61 according to FIG. 5a to FIG. 5f. The illumination angle and observation angle are 8° in FIG. 6e and 30° in FIG. 6f. Here, a dyed polymer layer approx. 240 nm thick was applied to the metal layer 21 made of aluminum. The polymer layer has a yellow dye, in particular Solvent Yellow 82, which is embedded in a matrix of polymethyl methacrylate (PMMA). The concentration of the yellow dye is so high that the security element 2 looks like a so-called "gold foil" in areas without the relief structure 61. For comparison, the reflection spectrum of the dyed security element 2 measured at 8° in an area without relief structure—i.e. just dye on aluminum—is to be seen in both figures as a thin, dashed line.

The interaction of the yellow dye with the metal layer with molded relief structure 61 leads, as shown in FIG. 6e, on the one hand to a massively higher reflected intensity above a wavelength of 560 nm. The edge of the reflection spectrum is also much steeper. On the other hand, the reflected intensity below 500 nm is depressed to below 10% reflection. Both yield a stronger and more contrast-rich red color impression at this observation angle of 8°. At an observation angle of 30° there is likewise a stronger and more contrast-rich—in this case green—color impression (FIG. 6f. The reflection peak relevant for the green color impression is shifted slightly to higher wavelengths and, above all, has steeper edges.

Figure 7B:
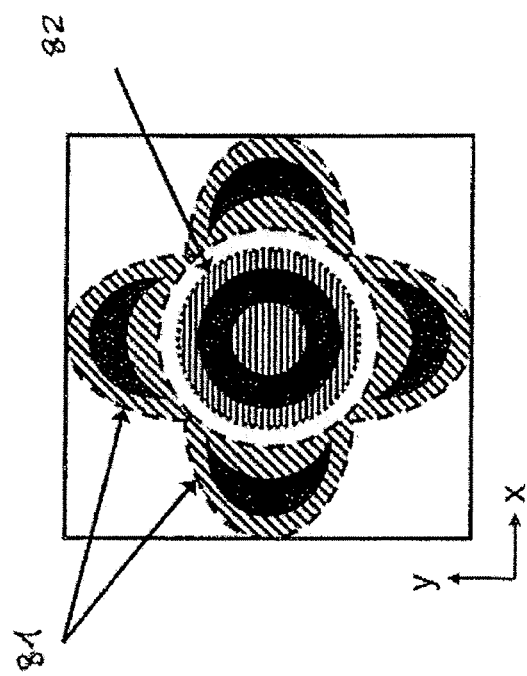
FIG. 7b shows a schematic top view of the security element according to FIG. 7a after application of two layers containing a dye or luminescent substance.
Figure 7A:
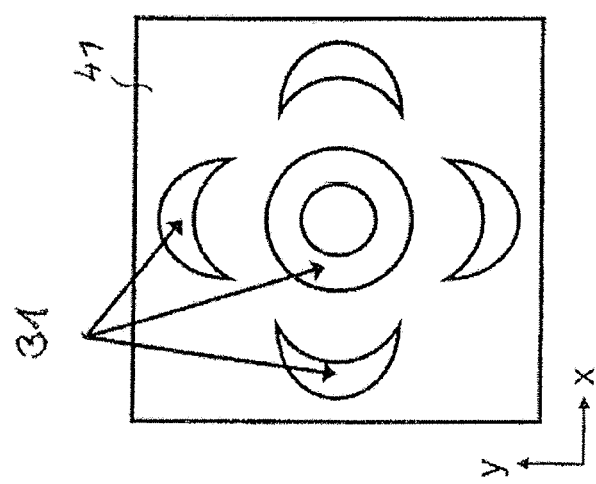
FIG. 7a shows a schematic top view of a security element.

Through the use of one or more layers 22 which contain one or more dyes and/or luminescent substances, for example the effects explained with reference to FIG. 7a and FIG. 7b can thus be implemented:

FIG. 7a and FIG. 7b in each case show a cut section of the security element 2 which has several areas 31 and a background area 41 surrounding them. In the areas 31—as set out above—the relief structure 61 is molded into the metal layer 21 and a relief structure 62 different from this, for example a holographic structure, or a mirror surface is molded in the area 41. The relief structure 61 can be identical in the areas 31, or can differ, e.g. differ in terms of the period P.

As shown in FIG. 7b, a first layer 22 is further arranged in areas 81 and a second layer 22 is arranged neighboring the metal layer 21, for example printed onto the metal layer 21, in an area 82. The layer 22 provided in the areas 81 here has a first dye and the layer 22 provided in the area 82 has a second dye, wherein the first dye and the second dye are different dyes, which have different colors. Through the interaction between the relief structure 61 in the areas 31 and the dyes of the layers 22 arranged in the areas 81 and 82 two different color impressions result which are, however, limited precisely to the area of the relief structure 61, i.e. to the areas 31. This occurrence of the strong color impressions is limited in FIG. 7b to the surface areas identified in black. The other areas of the security element 2, for example the areas 41, are covered with relief structures which do not govern with the dyes of the layers 22, with the result that in these areas the color effect layers 22 are not or are barely visible. For this, the concentration of the dyes with layers 22 is preferably to be chosen, as set out above, such that areas which are printed with these layers and have no relief structures formed like the relief structure 61 are almost unchanged, i.e. appear not to be colored. Alternatively, the areas 81 and 82 with the dyes can prove to be smaller than the areas 31. In the case of register-accurate replication into these areas 81 and 82 it is hereby possible to ensure that the dyes are only present in areas 31 with the relief structure.

Further, the above-described interactions between dyes or luminescent substances and the relief structures 61 also occur in transmission, with the result that the above embodiment examples according to FIGS. 6a to 7b are also transferable correspondingly to a design of the security element according to FIG. 3.

The parameters of the relief structure 61, i.e. in particular the period P, the azimuth angle, the relief depth t, the base surface area and the profile shape can be chosen to be constant in the whole region of an area 31 or 32. Thus, it is possible for example for an area 31 molded in the form of a letter "A" to be covered, in a rectangular area, with a relief structure 61 which appears red in the case of perpendicular observation and green in the case of inclined, i.e. tilted, observation. Further, an area 32 molded in the form of a letter "B" is provided which is covered with a different relief structure 61 which appears yellow in the case of perpendicular observation, and in which this color disappears when tilted. Further, a background area 41 is provided in which the relief structure is formed by a mat structure. In the case of perpendicular observation, a red "A" and a yellow "B" thus appear against a gray background.

It is further also possible for one or more of these parameters to vary in the area 31 or 32. Thus, it is possible, for example, for the period of the relief structure 61 to increase slightly from the edge to the center of an area 31 or 32 and then to decrease again slightly towards the opposite edge. The variation of the period here should be less than ±10%, better less than ±5%, in particular should be between 10 nm and 50 nm. Through such a procedure, movement effects can be achieved. It has been shown that the steep edge and also the peak in the reflection or transmission spectra of the relief structure 61 moves with an increasing grating period towards larger wavelengths. This peak shift or edge shift is utilized for the above-named movement effect. Further, it is also conceivable for a movement effect to be imitated by variation of the azimuth angle φ. In the case of cross gratings, however, it is to be taken into account that the azimuth angle can only be varied between 0° and 45°, in the case of hexagonal gratings only between 0° and 30°.

Further, it is also possible for the areas 31 and 32 to comprise one or more zones in which one or more of the parameters of the first relief structure 61 are chosen to be different.

Thus, FIG. 8a and FIG. 8b in each case show an area 35 which is molded in the form of an "I" and "F" respectively and which in each case is divided into several zones 351, 352, 353 and 354. In the zones 351, 352, 353 and 354, in each case one or more of the parameters of the relief structures 61 are chosen to be different, in particular the period P, the relief depth t or the azimuth angle of the relief structure 61. Further, it is also possible for one or more of the above-named parameters to be varied differently in the respective zones 351, 352, 353 and 354, as has also already been stated previously.

The zones 351, 352, 353 and 354 further preferably have at least one lateral dimension of less than 300 µm, for example a width of less than 300 µm and a length of more than 2 mm. In this way, for example, movement effects in opposite directions can also be realized in the areas 35.

In the case of the "I" from FIG. 8a, a "rolling bar" effect results in which a color band appears to move over the "I". For example, a reddish core of the "I" (with a yellowish or greenish external area) can move when the multilayer body is tilted in the direction of the angle of view.

In the case of the "F" from FIG. 8b, the "rolling bar" effect can even be designed such that it moves from left to right in the vertical bar of the "F" and from top to bottom in the horizontal bars of the "F". These are very striking effects, even for laypeople.

Figure 9C:
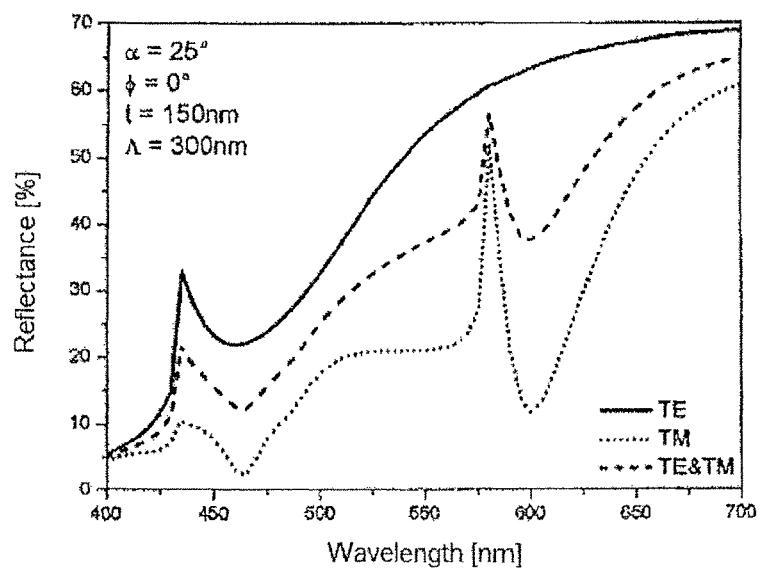
FIG. 9c shows a diagram to illustrate the reflection behavior of the security element according to FIGS. 9a and b.

FIG. 9a and FIG. 9b further show an area 36 of the security element 2 which consists of two zones 361 and 362. In the zones 361 and 362 the parameters of the relief structure 61 are chosen such that these areas differ in terms of their polarization properties. Thus, FIG. 9c shows the reflectance of a cross grating with a period of 300 nm and a depth of 150 nm for the TE-polarized component of the reflected light as well as for the TM-polarized component of the reflected light (at an observation angle of 25°). When the TE-polarized component is observed, a substantially yellow color impression appears. If the polarizer is rotated through 90°, the TM component which appears red is seen. The averaged spectrum TE and TM is seen unpolarized. When observed without polarizer, the color impression of the relief structure 61 is typically very similar to almost identical, in the case of rotation in the x/y plane, i.e. independently of the azimuth angle. This applies in particular to cross gratings. When observed resolved through a polarizer, this is not necessarily the case, with the result that a design can also be realized which, when observed without polarizer, has a monochromatic surface but, when observed with polarizer on the other hand, reveals an additional item of information.

For this, the relief structure 61 in the zones 361 and 362 is chosen such that the azimuth angle φ of the relief structure 61 differs in the zones 361 and 362, for example the azimuth angle φ in the zone 362 is chosen to be rotated through at least 15° relative to the zone 361. Preferably, when cross gratings are used, the azimuth angles φ in the zones 361 and 362 are arranged rotated through approx. 45° relative to each other.

Through this procedure, a security feature can thus be realized in which, in the case of observation without polarizer, an area, for example the area 36, appears in a uniform color, but in the case of observation through a polarizer an item of information standing out due to a different coloring becomes visible, thus for example the zone 361 appears yellow and the zone 362 appears red.

Further, it is possible, through a corresponding design of the relief structure 61, also to integrate glitter effects or glimmer effects into the colored appearance. This is illustrated below with reference to FIG. 10a to FIG. 10d.

Figure 10A:
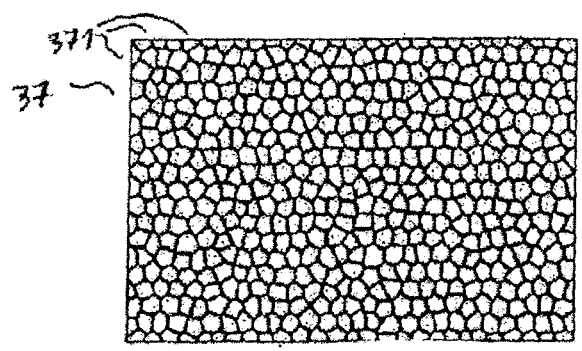
FIG. 10a and FIG. 10b show schematic top views of an area of a security element.
Figure 10B:
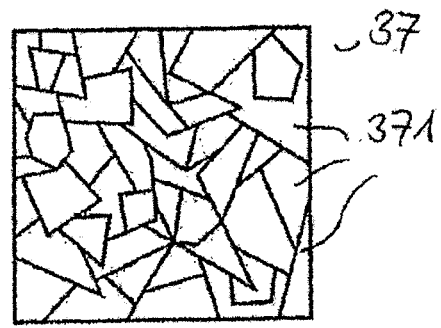

FIG. 10a and FIG. 10b show an area 37 which is composed of a plurality of partial areas 371. The partial areas 371 preferably have as irregular as possible a shaping. In each of the partial areas 371 the parameters of the relief structure 61 are chosen according to a predetermined relief structure which is selected from a set of predefined relief structures pseudorandomly for the respective partial area 371. Several relief structures, for example relief structures G1, G2, G3 and G4, are predefined, which differ, for example, in terms of their azimuth orientation and/or their period and their relief depth. From this set of relief structures G1 to G4, for each of the partial areas 371, one of the relief structures G1 to G4 is then selected pseudorandomly and a corresponding relief structure is molded as relief structure 61 in the respective partial area 371.

Figure 11:
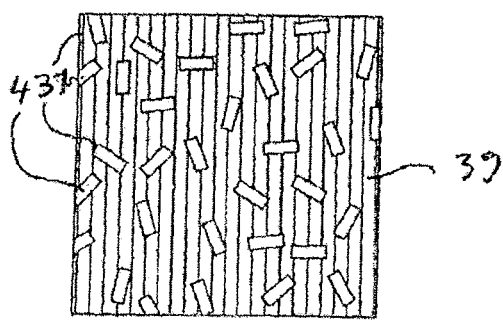
FIG. 11 shows a schematic top view of a cut section of a security element comprising a second area, formed of several partial areas, and a first area.

Further, such glitter effects can also be realized by means of the arrangement of areas shown in FIG. 11.

FIG. 11 shows a cut section from a security element 2 which has an area, consisting of a plurality of partial areas 431, in which the relief structure 62 is molded, and consists of an area 39 in which the relief structure 61 is molded and which forms the background area of the partial areas 431. The relief structure 62 preferably consists of a mirror surface or an achromatic structure, for example a blaze grating, the azimuth orientation of which is chosen randomly. Further, the partial areas 431 are preferably arranged randomly in front of the background of the area 39 and/or chosen pseudorandomly in terms of their orientation, for example the orientation of their longitudinal edges. Metallic glittering is hereby added to the color surface, which has a high-quality effect similar to metallic paints for cars.

In respect of the formation of the relief structure 61 in the area 39 reference is made to the previous statements.

Further, it is also possible for the relief structure 61 to be molded in the partial areas 431 and for the relief structure 62 to be molded in the area 39.

Figure 12A:
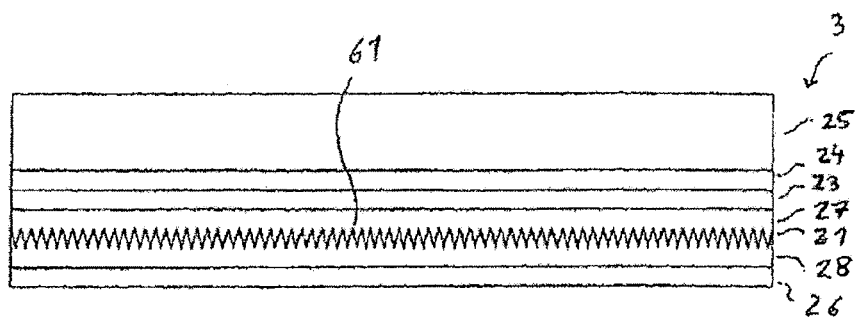
FIG. 12a shows a schematic sectional representation of a transfer film.

Further, it is also possible for the security element 2 to be provided by stamping a partial area of a transfer layer of a transfer film. FIG. 12a thus shows, by way of example, a transfer film 3 with a carrier film 25, a release layer 24, a protective varnish layer 23, a replication varnish layer 27, the metal layer 21, a protective varnish layer 28 and an adhesive layer 26. The relief structure 61 is molded into the metal layer 21. In respect of the design of the metal layer 21 and the relief structure 61 reference is made here to the above statements and in particular to FIG. 1 to FIG. 11.

Figure 12B:
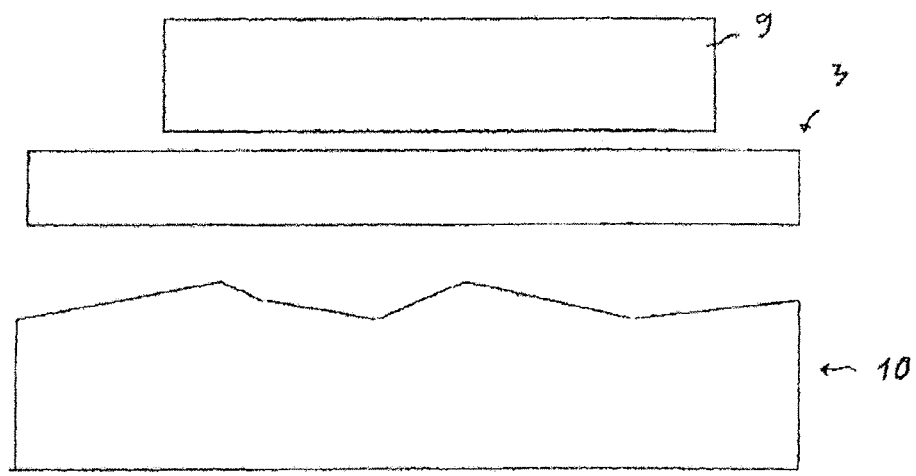
FIG. 12b shows a schematic sectional representation of an arrangement for stamping the transfer film according to FIG. 12a onto a substrate.

The transfer film 3 is then, as shown in FIG. 12b, molded by means of an embossing die 9 onto the surface of a substrate, for example of the substrate 10 of the security document 1. After the stamping, the carrier film 25 is then peeled off with the areas of the transfer layer which have not been pressed against the substrate 10 by the embossing die 9. Two different effects can be achieved hereby: thus, firstly, the metal layer 21 provided in the area 33 over the whole surface in the transfer film 3, with the relief structure 61 (see FIG. 12c), is not completely transferred onto the substrate 10, but only transferred patterned in the area in which the embossing die presses the transfer film 3 against the substrate 10. After the stamping, for example, the design of the metal layer 21 shown in FIG. 12d, with the relief structure 61, thus results, i.e. the metal layer 21 with the relief structure 61 is provided in an area 34 on the substrate 10 which is molded for example in the form of the number "50". Further, depending on the type of substrate, the following effect results: as indicated in FIG. 12b, the surface of the substrate 10 preferably does not have a smooth and flat surface, but has a surface which has a certain degree of surface roughness, for example shows a mat appearance, or in which a coarse structure has already been molded. The stamping pressure with which the embossing die 9 now presses the transfer film 3 against the substrate 10 is now preferably chosen such that the base surface 616 of the relief structure 61 is deformed according to the relief structure of the surface of the substrate 10, for example is deformed likewise in the form of a mat structure or a coarse structure.

It has been shown that, through such a procedure, for example the angle of view at which the color effects of the relief structure 61 in the area 34 are visible can be significantly increased, or that additionally movement, shape-change (morphing) or 3D effects can be introduced in this way into the security element 2 by corresponding choice of a coarse structure.

Alternatively, it is also possible to process a security element 2 with the metal layer 21 and the relief structure 61 molded in this in a further operation by means of a blind embossing die, in the stamping surface of which a coarse structure or mat structure is molded. Here too, the stamping pressure with which the blind embossing die is pressed against the security element 2 is preferably chosen such that the base surface of the relief structure 61 is deformed according to the coarse structure or mat structure of the blind embossing die, whereby the above-described advantages can also be achieved by this procedure.

Figure 13:
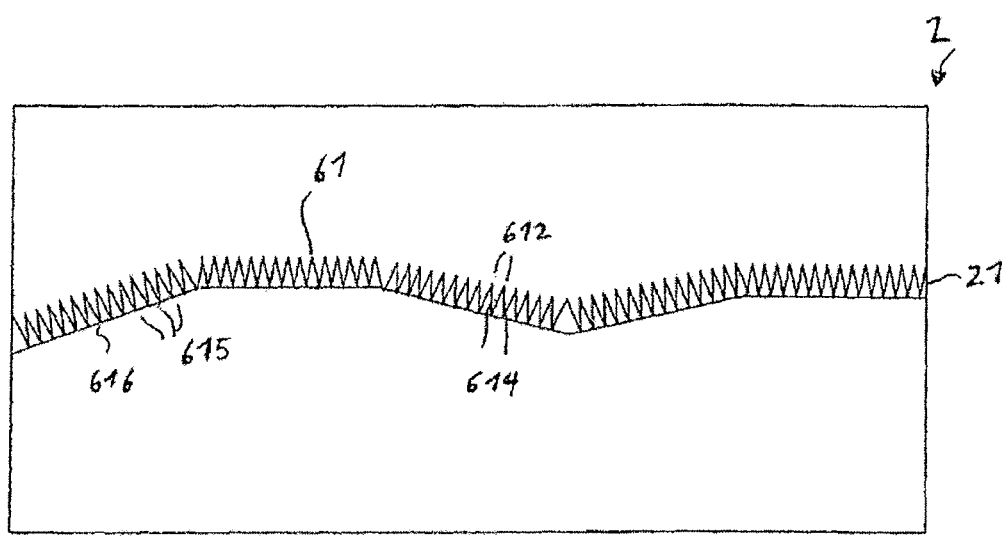
FIG. 13 shows a schematic sectional representation of a cut section of a security element.

Further, it is also possible to design the relief structure 61, even during the production of the security element 2, such that the base surface of the relief structure 61 does not have the form of a flat surface, but has the shaping of a coarse structure or mat structure. However, the depth of such structures is usually much smaller than can be achieved in the case of blind embossing. FIG. 13 shows, by way of example, a cut section of a security element 2 with the metal layer 21 into which such a relief structure 61 is molded. In respect of the design of the security element 2, reference is made to the previous statements according to FIG. 1 to FIG. 11. In an area 38 the base surface 616 of the relief structure 61, as shown in FIG. 13, is now molded not as a plane, but in the form of a coarse structure, whereby the above-described effects can be realized.

Figure 14A:
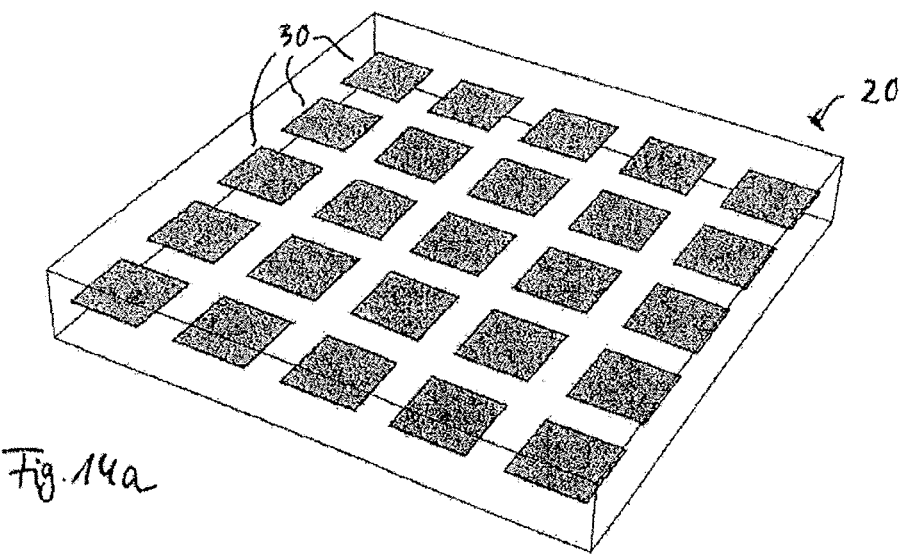
FIG. 14a shows a schematic representation of a cut section of a security element in which an area covered with a relief structure is formed by several partial areas.

Further, it is also possible to provide movement effects and glitter effects by the following procedure: one area or several areas of the security element 2 have a plurality of partial areas, wherein each of the partial areas has a minimum dimension of 3 μm and a maximum dimension of less than 300 μm. FIG. 14a shows, by way of example, the cut section of such an area of the security element 2 with a plurality of partial areas 30.

Figure 14B:
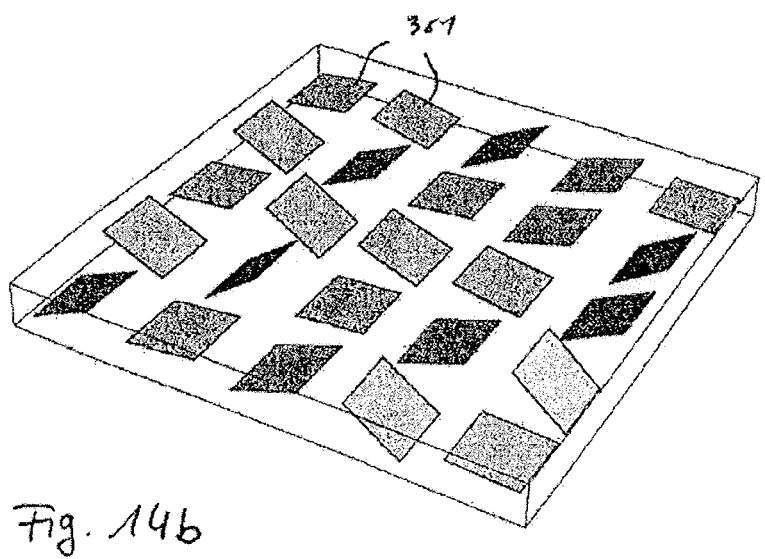

In the partial areas 30 the relief structure 61 is now molded into the metal layer 21. For each of the partial areas 30, one or more of the parameters of the relief structure 61 and/or the partial area 30 is further varied pseudorandomly. It is particularly advantageous here to vary at least one of the parameters: shape of the partial area, area size of the partial area, position of the center of area of the partial area, inclination angle of the base surface 616 of the relief structure 61 relative to a base plane, angle of rotation of the base surface 616 of the relief structure 61 about an axis perpendicular to the base plane, azimuth angle of the relief structure 61, period P of the relief structure, pseudorandomly within a respectively predefined variation range. FIG. 14b thus illustrates, for example, a corresponding pseudorandom variation of the inclination angle of the base surface 616 of the relief structure 61 for the partial areas 30.

Outside the partial areas 30 the relief structure 61 is preferably not molded into the metal layer 21. In these areas the relief structure 62 is preferably molded or the metal layer 21 is not provided in these areas, with the result that in these areas no optical action is developed by the metal layer 21.

The invention claimed is:

1. A security element for security documents, the security element comprising a multilayer body with an upper side and an underside, wherein the multilayer body has a metal layer with a first surface facing in a direction toward the upper side of the multilayer body and a second surface facing in a direction toward the underside of the multilayer body; and wherein the multilayer body further comprises a first layer bordering at least one of the first and second surfaces of the metal layer and a second layer bordering the other of the first and second surfaces of the metal layer, wherein an optically active surface relief is molded in areas of at least one of the first and second surfaces of the metal layer, and wherein, in at least one first area of the multilayer body, the surface relief is formed by a first relief structure which has a sequence of elevations and depressions, the elevations of which follow on from each other with a period P which is smaller than a wavelength of visible light, wherein the minima of the depressions lie on a base surface and the first relief structure has a relief depth t which is determined by the spacing of the maxima of the elevations of the first relief structure from the base surface in a direction perpendicular to the base surface, and wherein the sequence of elevations and depressions define a profile shape, wherein the profile shape or the relief depth t of the first relief structure is chosen such that the colored appearance of the light incident on the first area at least at one first angle of incidence and reflected directly by the metal layer in the first area or transmitted directly through the metal layer is modified by plasmon resonance of the metal layer with the incident light, and wherein at least one of the first layer and second layer has dyes or luminescent substances, wherein the first or second layer covers the first surface or the second surface of the metal layer in areas or over the whole surface in the first area or in at least one of the first areas in which the first relief structure is molded into the first or second surface of the metal layer, and wherein, in the first area or in at least one of the first areas, the first or second layer having the dyes or luminescent substances is arranged less than 1 μm away from the first surface or the second surface of the metal layer, and wherein the dyes or luminescent substances comprise a soluble dye or luminescent substance which is dissolved in the binder of the at least one of the first or second layer, and wherein the at least one of the first or second layer having the dyes or luminescent substances has a transmittance of at least 70% in the wavelength range visible to the human eye, and wherein the first layer or the second layer is applied to the first surface or second surface of the metal layer only in the first area, or the first layer or the second layer is applied to the first or second surface of the metal layer only in areas of the first surface or second surface in which the first relief structure is molded into the first surface or second surface, and wherein the percentage by weight of the dye or of the luminescent substance in the dry weight of the first or second layer is between 0.5% and 10%.

2. The security element according to claim 1, wherein the profile shape and/or the relief depth t of the first relief structure is chosen such that at a second angle of incidence different from the first angle of incidence the colored appearance of the light reflected directly by the metal layer in the first partial area or transmitted directly through the metal layer is modified differently wherein different colors appear at these angles of incidence in the case of reflected light observation and in the case of transmitted light observation.

3. The security element according to claim 1, wherein the first relief structure has a profile shape that is asymmetrical in relation to the base surface.

4. The security element according to claim 1, wherein the elevations of the first relief structure have a width measured at a distance of t/2 from the base surface and the depressions of the first relief structure have a width measured at a distance of t/2 from the base surface, wherein the width of the elevations or the width of the depressions is greater than 0.6×P, or less than 0.4×P.

5. The security element according to claim 1, wherein the edge steepness of the first relief structure, at a distance t/2 from the base surface, is between 70° and 85°.

6. The security element according to claim 1, wherein the first relief structure has an edge steepness measured at a distance between t/4 and 3/4 t from the base surface, the edge steepness forming an angle of between 50° and 85°.

7. The security element according to claim 1, wherein the first relief structure has an edge steepness measured at a distance between 0 and t/4 from the base surface or measured at a distance between 3/4t and t from the base surface, the edge steepness forming an angle of between 0° and 40° with respect to the base surface.

8. The security element according to claim 1, wherein the period P of the first relief structure is between 250 nm and 450 nm.

9. The security element according to claim 1, wherein the relief depth t of the first relief structure is between 100 nm and 400 nm.

10. The security element according to claim 1, wherein, in the first area, the metal layer has a layer thickness of between 10 nm and 100 nm.

11. The security element according to claim 1, wherein, in the first area, the metal layer has a layer thickness d which corresponds to an optical depth of between 0.7 and 2.3.

12. The security element according to claim 1, wherein the first relief structure is a cross grating which has a sequence of elevations and depressions in two directions.

13. The security element according to claim 1, wherein the surface relief in one or more second areas and/or further areas is formed by a second relief structure which is or are selected from the group: diffractive relief structure, holographic relief structure, mirror surface, mat structure, macrostructure, lens, grid of microlenses.

14. The security element according to claim 13, wherein the at least one first area and the at least one second area are formed by a plurality of partial areas, wherein the partial areas of the first area and the partial areas of the second area are interleaved.

15. The security element according to claim 13, wherein the at least one second area is formed by a plurality of partial areas separated from each other, and the first area surrounds these partial areas of the background area.

16. The security element according to claim 1, wherein the first area or at least one of the first areas has a patterned shaping and has a shaping which contains an item of information which can only be made visible using an aid, and is molded in the form of a nanotext or a moire pattern.

17. The security element according to claim 1, wherein the first area or at least one of the first areas comprises one or more first zones in which one or more of the parameters of the first relief structure selected from the group: period P, azimuth angle, relief depth t, base surface area and profile shape, differ from the corresponding parameters of the first relief structure in one or more second zones of the first area.

18. The security element according to claim 17, wherein the one or more first and second zones are molded to form a motif, wherein the first zones form a foreground area of the motif and the second zones form a background area of the motif, or wherein the one or more first zones are molded to form a first motif and the one or more second zones are molded to form a second motif.

19. The security element according to claim 17, wherein the first or second zones in each case have at least one lateral dimension of less than 150 μm, and wherein the first or second zones are interleaved.

20. The security element according to claim 17, wherein the first zones are arranged to represent a first motif and the second zones are arranged to represent a second motif, or wherein the first and the second zones are arranged to generate a multicolored representation or to generate mixed colors by means of additive color mixing.

21. The security element according to claim 1, wherein, in the first area or in at least one of the first areas, the base surface of the first relief structure is formed by a mat structure.

22. The security element according to claim 1, wherein, in the first area or in at least one of the first areas, the azimuth angle of the sequence of elevations and depressions of the first relief structure is varied in areas.

23. The security element according to claim 1, wherein the first area or at least one of the first areas has a plurality of partial areas, wherein each of the partial areas has a minimum dimension of more than 3 μm and a maximum dimension of less than 300 μm, wherein one or more of the parameters selected from the group: shape of the partial area, area size of the partial area, position of the center of area of the partial area, inclination angle of the base surface of the first relief structure relative to a base plane, the rotational orientation of the sequence of elevations and depressions with respect to an axis perpendicular to the base plane, the azimuth angle of the sequence of elevations and depressions, period P of the relief structure, is varied pseudorandomly, for each of the partial areas, within a variation range predefined in each case for the first area.

24. The security element according to claim 1, wherein the first area or at least one of the first areas has a plurality of partial areas, and wherein the parameters of the first relief structure in each of the partial areas is chosen according to a relief structure selected from a set of predefined relief structures pseudorandomly for the respective partial area.

25. The security element according to claim 1, wherein the first layer or the second layer has a layer thickness of between 50 nm and 1 μm.

26. The security element according to claim 1, wherein the concentration of the dyes or luminescent substances in the area of the first or second layer less than 500 nm away from the first or second surface of the metal layer is higher than in the remaining area of the first or second layer.

27. The security element according to claim 1, wherein the first layer or the second layer is a replication varnish layer, a layer arranged between a replication varnish layer and the metal layer, or a protective varnish layer.

28. The security element according to claim 1, wherein the color of the dye or luminescent substance of the first or second layer is chosen such that its color, or its color when excited, corresponds to the color generated by the first relief structure for a particular angle of incidence of the incident light in direct reflection or transmission or differs from these colors.

29. The security element according to claim 1, wherein two or more first layers or two or more second layers are provided, the dyes or luminescent substances of which are chosen such that the color of the dyes or luminescent substances of the first layer or of the second layer mutually differ, and wherein the first area or at least one of the first areas has a first partial area which is covered with one of the first or second layers and has a second partial area which is covered with another of the first or second layers.

30. The security element according to claim 1, wherein the multilayer body is a transfer film, a laminating film or a security thread.

31. The security element according to claim 1, wherein the multilayer body is a security element of a banknote or an ID document.

32. The security element according to claim 1, wherein the multilayer body is a banknote, a card or an ID document.

33. A security element for security documents, the security element comprising a multilayer body with an upper side and an underside, wherein the multilayer body has a metal layer with a first surface facing in a direction toward the upper side of the multilayer body and a second surface facing in a direction toward the underside of the multilayer body, and wherein the multilayer body further comprises a first layer bordering at least one of the first and second surfaces of the metal layer, wherein an optically active surface relief is molded in areas of at least one of the first and second surfaces of the metal layer, and wherein, in at least one first area of the multilayer body, the surface relief is formed by a first relief structure which has a sequence of elevations and depressions, the elevations of which follow on from each other with a period P which is smaller than a wavelength of visible light, wherein the minima of the depressions lie on a base surface and the first relief structure has a relief depth t which is determined by the spacing of the maxima of the elevations of the first relief structure from the base surface in a direction perpendicular to the base surface, and wherein the sequence of elevations and depressions define a profile shape, wherein the profile shape or the relief depth t of the first relief structure is chosen such that the colored appearance of the light incident on the first area at least at one first angle of incidence and reflected directly by the metal layer in the first area or transmitted directly through the metal layer is modified by plasmon resonance of the metal layer with the incident light, and wherein the first layer bordering the first surface of the has dyes or luminescent substances, wherein the first layer covers the first surface or the second surface of the metal layer in areas or over the whole surface in the first area or in at least one of the first areas in which the first relief structure is molded into the first or second surface, and wherein the dyes or luminescent substances of the first layer have a color, wherein, when the dyes or luminescent substances are excited, the color corresponds to the color generated by the first relief structure for a particular angle of incidence of the incident light in direct reflection or transmission or differs from these colors, and wherein the first layer is applied to the first surface or second surface of the metal layer only in the first area, or the first layer is applied to the first or second surface of the metal layer only in areas of the first surface or second surface in which the first relief structure is molded into the first surface or second surface, and
wherein the percentage by weight of the dye or of the luminescent substance in the dry weight of the first layer is between 0.5% and 10%.

34. The security element according to claim 33, wherein, in the first area or in at least one of the first areas, the at least one of the first having the dyes or luminescent substances is arranged less than 1 µm away from the first surface or the second surface of the metal layer.

35. The security element according to claim 34, wherein the dye or luminescent substance is a soluble dye or luminescent substance which is dissolved in the binder of the first layer.

36. The security element according to claim 35, wherein the first layer has a transmittance of at least 70% in the wavelength range visible to the human eye.

37. A security element for security documents, the security element comprising a multilayer body, the multilayer comprising;
   a metal layer having an optically active surface relief molded in a first surface of the metal layer in a first area, the surface relief not being provided in the first surface in a second area, wherein the surface relief is formed by a first relief structure which has a sequence of elevations and depressions, the elevations of which follow on from each other with a period P which is smaller than a wavelength of visible light, wherein the minima of the depressions lie on a base surface and the first relief structure has a relief depth t which is determined by the spacing of the maxima of the elevations of the first relief structure from the base surface in a direction perpendicular to the base surface, and wherein the sequence of elevations and depressions define a profile shape, wherein the profile shape or the relief depth t of the first relief structure is chosen such that the colored appearance of the light incident on the first area at least at one first angle of incidence and reflected directly by the metal layer in the first area or transmitted directly through the metal layer is modified by plasmon resonance of the metal layer with the incident light; and
   a color layer arranged less than 1 µm away from the first surface of the metal layer only in the first area, wherein the color layer is not provided in the second area, and wherein the color layer comprises a soluble dye or a luminescent substance which is dissolved in a binder of the color layer, and wherein the color layer has a transmittance of at least 70% in the wavelength range visible to the human eye, and wherein the percentage by weight of the dye or of the luminescent substance in the dry weight of the color layer is between 0.5% and 10%, and wherein the color layer has a color corresponding to a color generated by the first relief structure for a particular angle of incidence of the incident light in direct reflection or transmission.

38. A security element for security documents, the security element comprising a multilayer body, the multilayer comprising;
   a metal layer having an optically active surface relief molded in a first surface of the metal layer, wherein the surface relief is formed by a first relief structure in a first area and is formed by a second relief structure in a second area, the first relief structure having a sequence of elevations and depressions, the elevations of which follow on from each other with a period P which is smaller than a wavelength of visible light, wherein the minima of the depressions lie on a base surface and the first relief structure has a relief depth t which is determined by the spacing of the maxima of the elevations of the first relief structure from the base surface in a direction perpendicular to the base surface, and wherein the sequence of elevations and depressions define a profile shape, wherein the profile shape or the relief depth t of the first relief structure is chosen such that the colored appearance of the light incident on the first area at least at one first angle of incidence and reflected directly by the metal layer in the first area or transmitted directly through the metal layer is modified by plasmon resonance of the metal layer with the incident light, and wherein the second relief structure in the second area is formed as a mirror surface, a diffractive structure, a macrostructure or a mat structure; and
   a color layer arranged less than 1 µm away from the first surface of the metal layer, wherein the color layer comprises a soluble dye or a luminescent substance which is dissolved in a binder of the color layer, and wherein the color layer has a transmittance of at least 70% in the wavelength range visible to the human eye, and wherein the percentage by weight of the dye or of the luminescent substance in the dry weight of the color layer is between 0.5% and 10%, and wherein the color layer has a color corresponding to a color generated by the first relief structure for a particular angle of incidence of the incident light in direct reflection or transmission, and wherein the concentration of the dye or luminescent substances in the color layer is chosen such that the optical action thereof in the second area, in which the surface relief is formed by a mirror surface, a diffractive structure, a macrostructure or a mat structure, is not visible to the human observer at an observation distance of more than 30 cm and under an illumination with an illuminance of less than 10,000 LUX.

* * * * *